United States Patent
Yamamoto

(10) Patent No.: US 10,627,927 B2
(45) Date of Patent: Apr. 21, 2020

(54) POSITION INDICATOR

(71) Applicant: Wacom Co., Ltd., Saitama (JP)

(72) Inventor: Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 140 days.

(21) Appl. No.: 15/626,911

(22) Filed: Jun. 19, 2017

(65) Prior Publication Data

US 2017/0285772 A1    Oct. 5, 2017

Related U.S. Application Data

(63) Continuation of application No. PCT/JP2015/051229, filed on Jan. 19, 2015.

(51) Int. Cl.
| | |
|---|---|
| *G06F 3/0354* | (2013.01) |
| *G06F 3/038* | (2013.01) |
| *G06F 3/044* | (2006.01) |
| *G06F 3/041* | (2006.01) |
| *G06F 3/046* | (2006.01) |

(52) U.S. Cl.
CPC ........ *G06F 3/0383* (2013.01); *G06F 3/03545* (2013.01); *G06F 3/044* (2013.01); *G06F 3/046* (2013.01); *G06F 3/0416* (2013.01); *G06F 2203/0384* (2013.01)

(58) Field of Classification Search
CPC ......... G06F 2203/0384; G06F 3/03545; G06F 3/0383; G06F 3/0416; G06F 3/044; G06F 3/046

See application file for complete search history.

(56) References Cited

U.S. PATENT DOCUMENTS

| 8,199,132 B1 | 6/2012 | Oda et al. |
| 8,487,891 B2 | 7/2013 | Oda et al. |
| 8,913,041 B2 | 12/2014 | Fukushima et al. |
| 9,024,893 B2 | 5/2015 | Chu et al. |

(Continued)

FOREIGN PATENT DOCUMENTS

| CN | 102981659 A | 3/2013 |
| EP | 0 773 509 A1 | 5/1997 |

(Continued)

OTHER PUBLICATIONS

Supplementary European Search Report, dated Aug. 9, 2018, for European Application No. 15878700.2, 16 pages.

(Continued)

*Primary Examiner* — Hong Zhou
(74) *Attorney, Agent, or Firm* — Seed IP Law Group LLP

(57) ABSTRACT

A single position indicator that can be used with a plurality of different types of position detection systems. The position indicator includes a communication circuit which, in operation, communicates with an outer device, a configuration circuit which, in operation, performs an initial setting process based on a signal from the outer device, a signal generation circuit which, in operation, generates a stylus position signal, and a control circuit. The control circuit, in operation, controls transmission of the stylus position signal based on an initial setting of at least one switch circuit that is set by the initial setting process performed by the configuration circuit, and controls reception of a signal received from the outer device via the communication circuit.

20 Claims, 16 Drawing Sheets

(56) References Cited

U.S. PATENT DOCUMENTS

| | | | |
|---|---|---|---|
| 9,063,025 B2 | 6/2015 | Horie et al. | |
| 9,268,417 B2 | 2/2016 | Oda et al. | |
| 2009/0139780 A1 | 6/2009 | Katsurahira et al. | |
| 2010/0085325 A1* | 4/2010 | King-Smith | G06F 3/03545 345/174 |
| 2012/0013555 A1 | 1/2012 | Maeda et al. | |
| 2012/0105361 A1 | 5/2012 | Kremin et al. | |
| 2013/0207938 A1 | 8/2013 | Ryshtun et al. | |
| 2014/0104187 A1 | 4/2014 | Bakken et al. | |
| 2014/0176495 A1* | 6/2014 | Vlasov | G06F 3/03545 345/174 |
| 2014/0333588 A1 | 11/2014 | Lo et al. | |
| 2014/0354588 A1 | 12/2014 | Hsiao et al. | |
| 2015/0331502 A1* | 11/2015 | Perrin | G06F 3/041 345/179 |
| 2017/0131798 A1* | 5/2017 | Geaghan | G06F 3/044 |
| 2017/0315631 A1* | 11/2017 | Pourbigharaz | G06F 3/03545 |
| 2019/0050110 A1 | 2/2019 | King-Smith et al. | |

FOREIGN PATENT DOCUMENTS

| | | |
|---|---|---|
| EP | 2 159 669 A2 | 3/2010 |
| EP | 2 172 834 A2 | 4/2010 |
| JP | 7-295722 A | 11/1995 |
| JP | 9-134246 A | 5/1997 |
| JP | 2004-199560 A | 7/2004 |
| JP | 2005-149140 A | 6/2005 |
| JP | 2011-3035 A | 1/2011 |
| JP | 4683505 B1 | 5/2011 |
| JP | 2011-186803 A | 9/2011 |
| JP | 2012-22543 A | 2/2012 |
| JP | 2012-221304 A | 11/2012 |
| JP | 2013-161307 A | 8/2013 |
| JP | 2014-209361 A | 11/2014 |

OTHER PUBLICATIONS

Chinese Office Action, dated Nov. 1, 2019, for Chinese Application No. 201580069384.5, 10 pages. (with English translation).
Japanese Office Action, dated Oct. 9, 2019, for Japanese Application No. 2019-025101, 11 pages. (with English translation).
Korean Office Action, dated Dec. 18, 2019, for Korean Application No. 10-2017-7018244, 17 pages. (With English translation).

* cited by examiner

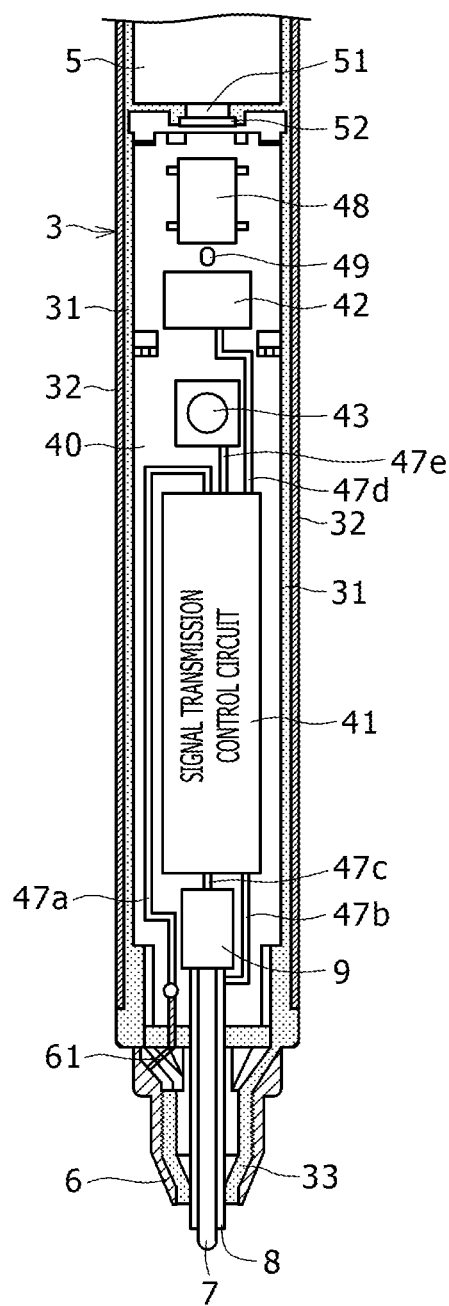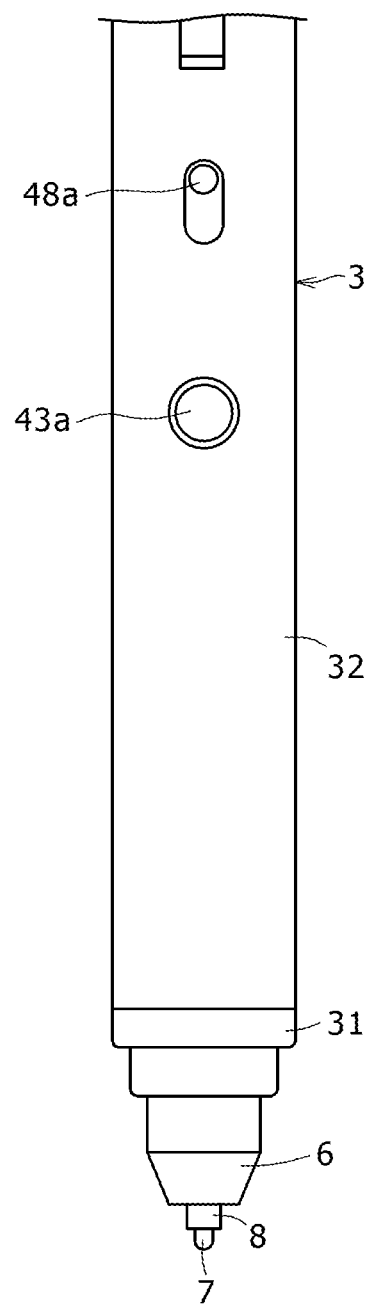

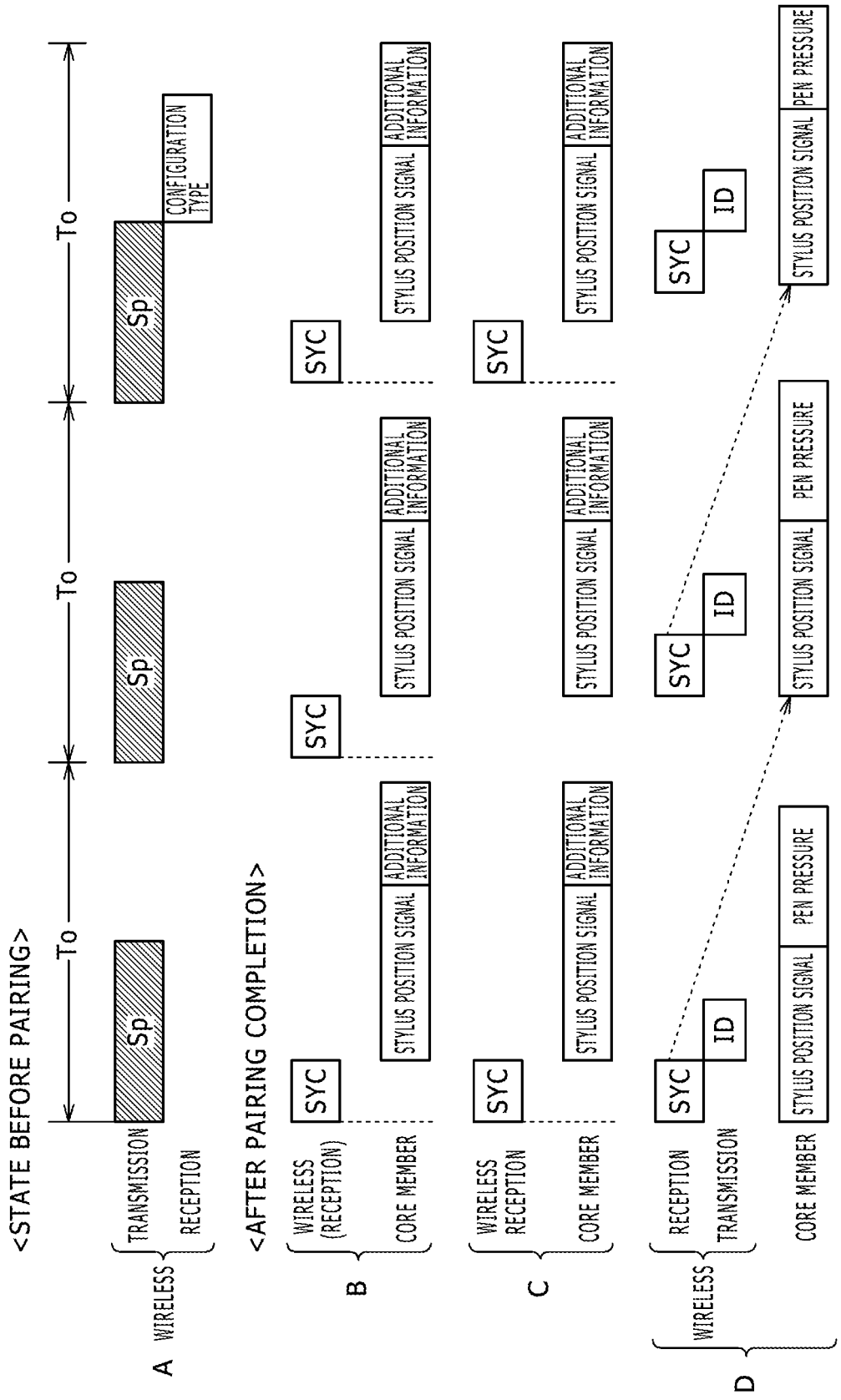

FIG. 5

PEN TYPE TABLE INFORMATION

| | CONFIGURATION TYPE 1 | CONFIGURATION TYPE 2 | CONFIGURATION TYPE 3 | CONFIGURATION TYPE 4 | CONFIGURATION TYPE 5 |
|---|---|---|---|---|---|
| STYLUS POSITION SIGNAL | NO SIGNAL | FROM POSITION DETECTION SYSTEM | CENTER ELECTRODE | CENTER ELECTRODE | CENTER ELECTRODE |
| PEN PRESSURE INFORMATION | WIRELESS | WIRELESS | WIRELESS | CENTER ELECTRODE | CENTER ELECTRODE |
| SIDE SWITCH INFORMATION | WIRELESS | WIRELESS | WIRELESS | CENTER ELECTRODE | CENTER ELECTRODE |
| IDENTIFICATION INFORMATION ID | WIRELESS | WIRELESS | WIRELESS | WIRELESS | CENTER ELECTRODE |

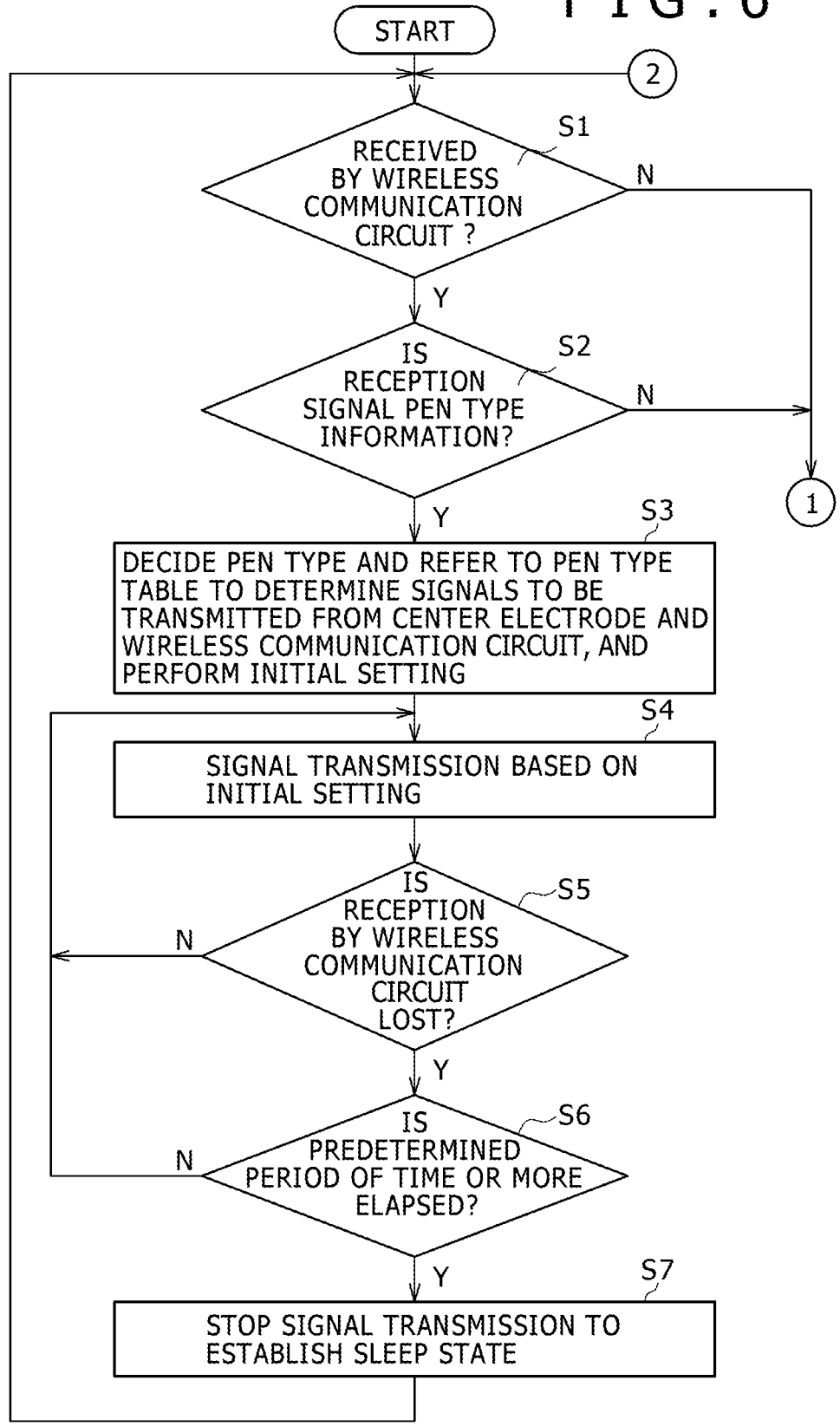

POSITION INDICATOR

BACKGROUND

Technical Field

The present disclosure relates to a position indicator (stylus) for use with a position detection system.

Description of Related Art

As a position inputting apparatus configured from a position detection system and a position indicator called electronic pen is configured in various types such as, for example, an electromagnetic coupling type and a capacitive coupling type depending upon the difference in the coupling method between a sensor of the position detection system and the electronic pen.

Even if position inputting apparatus are of the same type, various configuration types are available depending upon the difference between the exchange method of a stylus position signal between the sensor of the position detection system and the position indicator and the method for exchange of, between the position detection system and the position indicator, additional information such as operation information of a switch provided on the position indicator, pen pressure information, identification information of the position indicator and internal storage data or for exchange of instruction information for changing the action of the position indicator. Conventionally, a position indicator compatible with a position detection system is provided to a user while a method for a stylus position signal and a method for exchange of additional information are restricted to particular methods. Therefore, since it is necessary for a utilizer to have a position indicator for exclusive use for a position inputting apparatus which includes a position detection system having a similar position detection sensor, it is necessary for the utilizer to carry a plurality of position indicators and select a suitable position indicator for every position inputting apparatus.

For example, for a position indicator of the capacitive coupling type, a plurality of configuration types as described below is available. In particular, the position indicator of the first configuration type is a position indicator of a type (passive type) wherein a stylus position signal is not sent from the position indicator but a change of energy (or a voltage) induced in a conductor of a sensor of a position detection system at a position at which the position indicator is disposed when alternating electric field energy sent from the sensor of the position detection system is supplied to the earth (ground) via the position indicator and the human body is detected to perform position detection (refer to, for example, Patent Document 1 (Japanese Patent Laid-Open No. 2011-3035) and so forth).

Meanwhile, the position indicator of the second configuration type of the capacitive coupling type is an improvement of the first configuration type described above in regard to its low sensitivity in position detection and is a position indicator of the type wherein a signal is received from a sensor of a position detection system and is then fed back to the sensor after signal processing such as signal enhancement is performed for the received signal (improved type of the passive type) (refer to, for example, Patent Document 2 (Japanese Patent No. 4683505) and so forth). In the case of the position indicators of the first and second configuration types, additional information is transmitted or exchanged to the position detection sensor using, for example, a wireless communication circuit.

The position indicator of the third configuration type of the capacitive coupling type is, different from those of the first and second configuration types described above, a position indicator of the so-called active type wherein the position indicator includes an origination circuit and an origination signal from the origination circuit is supplied as a stylus position signal to the position detection sensor (refer to, for example, Patent Document 3 (Japanese Patent Laid-Open No. Hei 07-295722) and so forth). Although a sensor panel of a position detection circuit is used as the position detection system, position detection of a position indicated by the position indicator is performed from signal intensities of individual conductors which receive the origination signal from the position indicator of the active type.

In the case of such position indicators of the third configuration type, the position indicators are further classified into a plurality of types including a configuration type wherein all of additional information is sent to and received from the position detection system together with a stylus position signal and another configuration type wherein part of additional information is sent and received together with a stylus position signal while the other additional information is transmitted separately to a wireless communication circuit provided in the position detection system via a wireless communication circuit.

It is to be noted that, although detailed description is omitted, it is similar to the capacitive coupling type described above that, also in the electromagnetic coupling type, there exist a plurality of configuration types including a configuration type wherein the position indicator receives a signal from a sensor of the position detection system by a resonance circuit and the received signal is fed back to the sensor of the position detection system and another configuration type wherein an origination circuit is provided and an origination signal from the origination circuit is transmitted to a sensor of the position detection system via the resonance circuit as well as a configuration type wherein additional information is transmitted to a wireless communication circuit which transmits the additional information to a wireless communication circuit provided in the position detection system.

PRIOR ART DOCUMENTS PATENT DOCUMENTS

Patent Document 1: Japanese Patent Laid-Open No. 2011-3035
Patent Document 2: Japanese Patent No. 4683505
Patent Document 3: Japanese Patent Laid-Open No. Hei 07-295722

BRIEF SUMMARY OF DISCLOSURE

Technical Problems

Incidentally, in the past, even with position inputting apparatus of the same capacitive coupling type or electromagnetic coupling type, a position indicator compatible with a configuration type must be prepared for each of a plurality of different configuration types as described above. However, that a position indicator must be prepared for each of different configuration types in this manner imposes a burden in terms of the cost on its user and the user must manage the position indicators of the plurality of configuration types for compatibility with the position detection system, which is cumbersome.

It is an object of the present disclosure to solve the problems described above and provide a position indicator with which a plurality of configuration types can be utilized singly.

Technical Solution

In order to solve the problems described above, the present disclosure provides a position indicator, including: a communication circuit which, in operation, communicates with an outer device; a configuration circuit which, in operation, performs an initial setting process based on a signal from the outer device, an initial setting of at least one switch circuit being set by the initial setting process; a signal generation circuit which, in operation, generates a stylus position signal; and a control circuit which, in operation, controls transmission of the stylus position signal based on the initial setting set by the initial setting process performed by the configuration circuit, and controls reception of a signal received from the outer device.

In the position indicator according to the present disclosure having the configuration described above, the configuration circuit performs the initial setting for the position indicator based on the signal from the outer device received by the communication circuit. This initial setting can include switching setting of a plurality of configuration types. Further, the control circuit controls transmission of the stylus position signal on the basis of the initial setting process performed by the configuration circuit and the signal from the outer device.

Consequently, the position indicator according to the present disclosure can be configured to be compatible with various types of position detection systems.

Advantageous Effect

Since the position indicator according to the present disclosure can adopt, in response to a configuration type of a position detection system, a configuration (mode) compatible with the configuration type, there is no necessity to prepare a position indicator for each of a plurality of position detection systems of different configuration types. Therefore, the burden on a user in terms of cost can be reduced. Further, since only it is necessary for the user to prepare a single position indicator common to position detection systems of a plurality of configuration types, an effect is achieved that the necessity for cumbersome management for compatibility with a position detection system is eliminated.

BRIEF DESCRIPTION OF THE DRAWINGS

FIGS. 2A and 2B are views illustrating an example mechanical configuration of a position indicator according to one or more embodiments of the present disclosure.

FIG. 3 is a timing chart illustrating processing actions of a position indicator according to one or more embodiments of the present disclosure.

FIG. 5 is a view illustrating pen type table information of a position indicator according to one or more embodiments of the present disclosure.

FIG. 6 is a flow chart illustrating an example of a processing flow of a position indicator according to one or more embodiments of the present disclosure.

DETAILED DESCRIPTION

Figure 1:
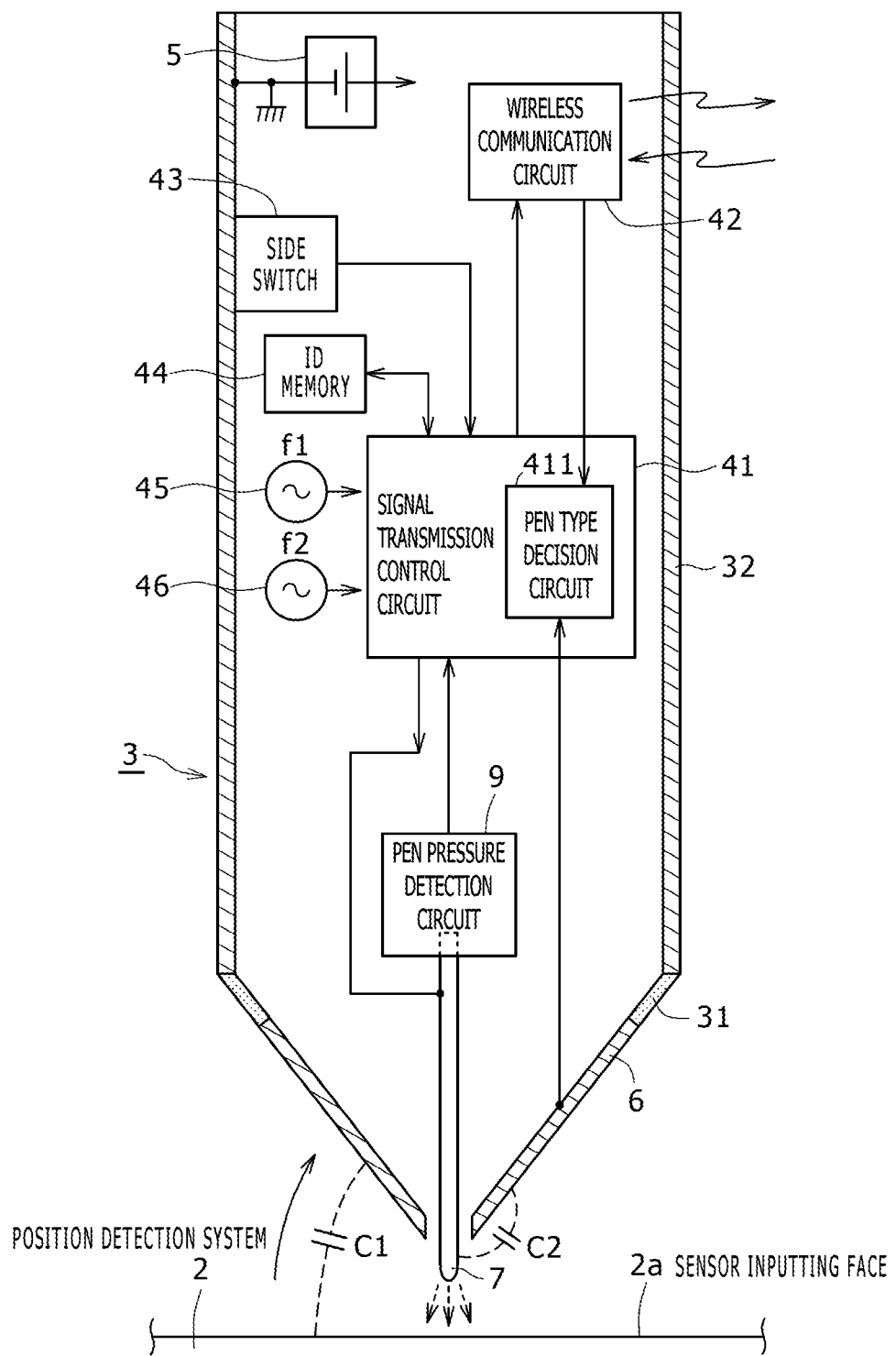
FIG. 1 is a view depicting a conceptual configuration of a position indicator according to one or more embodiments of the present disclosure.

In the following, embodiments of a position indicator according to the present disclosure are described with reference to the drawings. FIG. 1 is a view generally depicting a conceptual configuration and a processing action of a position indicator 1 of according to one or more embodiments of the present disclosure and is a view illustrating a state in which the position indicator 1 is positioned on a sensor inputting face 2a of a position detection system 2 of the capacitive type. Meanwhile, FIGS. 2A and 2B are views illustrating an example of a mechanical configuration of the position indicator 1, wherein FIG. 2A is a partial vertical sectional view and FIG. 2B is a view depicting part of an appearance of the position indicator 1. In the present embodiment, the position indicator 1 is formed such that an appearance thereof has a shape of a bar-like stylus.

[Description of Example of Mechanical Configuration of Position Indicator of Embodiment]

The position indicator 1 of the present embodiment includes a bar-like housing 3. The housing 3 is configured from an insulator portion 31 of a hollow cylindrical shape made of an insulating material, for example, a synthetic resin as depicted in FIG. 2A. In the present embodiment, an outer circumferential face of the insulator portion 31 of the housing 3 is covered, at least at a portion thereof at which an operator grasps the position indicator 1, with a conductor portion 32 made of, for example, a metal.

In the housing 3, a printed circuit board 40, a battery 5 and a pen pressure detection circuit 9 are disposed as depicted in FIG. 2A. The conductor portion 32 which covers the outer circumferential face of the housing 3 is, though not depicted, electrically connected to a grounding conductor of the printed circuit board 40.

On the printed circuit board 40, a signal transmission control circuit 41, a wireless communication circuit 42, a side switch 43 configured from a pushbutton switch, an identification (ID) memory 44 for storing ID information of the position indicator 1, oscillators 45 and 46 which output oscillation signals of frequencies f1 and f2 different from each other, and wiring patterns such as conductive patterns 47a to 47e are disposed as depicted in FIG. 1 and FIG. 2A. Further, in the present example, a power supply switch 48, an LED (Light Emitting Diode) 49 and so forth are disposed as depicted in FIG. 2A. It is to be noted that, while, in FIG. 2A, the conductive patterns 47a to 47e are schematically depicted as a single conductive pattern for the simplification of the illustration, naturally there also is a case in which the conductive patterns 47a to 47e are configured from a plurality of conductive patterns as occasion demands.

The battery 5 is a supply source of power to electronic circuits and electronic parts configured on the printed circuit board 40. The pen pressure detection circuit 9 is configured as a variable capacitor which demonstrates a capacitance corresponding to a pen pressure applied to a center electrode 7 which configures a core member.

The wireless communication circuit 42 configures an example of a communication circuit (first communication circuit) in the present disclosure and has a transmission circuit which is an example of a first transmission circuit and a reception circuit which is an example of a first reception circuit which receives a signal from the position detection system. In the present embodiment, the wireless communication circuit 42 is configured as a wireless communication circuit which complies with the Bluetooth (registered trademark) standard of a short-range wireless communication standard. The wireless communication circuit 42 is connected to the signal transmission control circuit 41. It is to be noted that the wireless communication circuit 42 may not comply with the Bluetooth but may be, for example, that by infrared communication, or a wireless communication circuit which complies with the Wi-Fi (registered trademark) standard may be used.

The side switch 43, ID memory 44 and pen pressure detection circuit 9 individually configure an additional information generation circuit. The side switch 43 supplies on or off information thereof as an example of additional information to the signal transmission control circuit 41. The ID memory 44 outputs identification information (ID: Identification) of the position indicator 1 stored therein as an example of additional information to the signal transmission control circuit 41 in response to a readout request from the signal transmission control circuit 41. The variable capacitor configured from the pen pressure detection circuit 9 demonstrates a capacitance variation in response to a value of a pen pressure applied to the center electrode 7 which configures the core member, and the signal transmission control circuit 41 generates pen pressure information as an example of additional information on the basis of the capacitance.

The oscillators 45 and 46 generate alternating signals for forming a stylus position signal to be sent from the position indicator 1 of the present embodiment and supply the generated alternating signals to the signal transmission control circuit 41. In the present embodiment, the oscillator 45 generates an alternating signal of the frequency f1 and the oscillator 46 generates an alternating signal of the frequency f2 different from the frequency f1. The signal transmission control circuit 41 generates different stylus position signals on the basis of the oscillator 45 and the oscillator 46. In particular, the signal transmission control circuit 41 cooperates with the oscillator 45 and the oscillator 46 to configure a circuit for generating a stylus position signal and configure two origination circuits. The signal transmission control circuit 41 uses one of the two generated stylus position signals as a stylus position signal to be sent from the position indicator 1. It is to be noted that, in place of the oscillators 45 and 46, a plurality of origination circuits which generate and originate stylus position signals for a plurality of position indicators of different configuration types of the active type hereinafter described may be provided and are selectively controlled by the signal transmission control circuit 41.

Further, in the present embodiment, the battery 5 is configured such that it is accommodated in the housing 3 in such a manner as depicted in FIG. 1 and FIG. 2A, and a power supply voltage for an electronic circuit such as the signal transmission control circuit 41 on the printed circuit board 40 is generated by the battery 5. In FIG. 2A, a terminal 52 is a terminal electrically connected to the power supply circuit on the printed circuit board 40. A positive side electrode 51 of the battery 5 contacts with and is electrically connected to the terminal 52. Though not depicted, a negative side electrode of the battery 5 is connected directly to the grounding conductor of the printed circuit board 40 or is pressed against and contacted with a terminal which is connected to the grounding conductor of the printed circuit board 40 via the conductor portion 32 of the housing 3 and is elastically displaced.

An operation element 48a of the power supply switch 48 disposed on the printed circuit board 40 is provided for operation from the outside through an opening provided in the housing 3 as depicted in FIG. 2B. If the user slidably moves the operation element 48a, then the power supply switch 48 can be switched on or off. It is to be noted that, while also a power supply circuit for generating a power supply voltage from the voltage of the battery 5 when the power supply switch 48 is on is formed on the printed circuit board 40, it is omitted for simplified illustration in FIGS. 1 and 2A.

One end portion side in a direction of a center axis of the insulator portion 31 of a hollow cylindrical shape configuring the housing 3 is formed as a tapering portion 33 which tapers gradually as depicted in FIG. 2A. To an outer circumference side of the tapering portion 33, a peripheral electrode 6 made of, for example, an annular conductive metal is attached. The peripheral electrode 6 and the conductor portion 32 on the outer circumferential surface of the housing 3 are isolated from each other by the insulator portion 31 interposed therebetween.

As schematically depicted in FIG. 1, the peripheral electrode 6 capacitively couples with the position detection system 2 to configure, in the present embodiment, a reception circuit for a signal from the position detection system. The peripheral electrode 6 is electrically connected to the conductive pattern 47a of the printed circuit board 40 by a lead conductor member 61 extending through the insulator portion 31. The conductive pattern 47a is connected, in the present example, to an input terminal of the signal transmission control circuit 41.

Further, in the present embodiment, the center electrode 7 configured from a bar-like member having conductivity is disposed such that one end side thereof projects to the outside from the hollow portion of the tapering portion 33 of the housing 3. This center electrode 7 serves as a core member configuring a pen tip of the position indicator 1 of a shape of a pen.

The center electrode 7 configures, in the present embodiment, an example of a second transmission circuit for transmitting a stylus position signal and is configured such that an end portion on the opposite side to the side on which it projects to the outside is electrically connected to the conductive pattern 47b formed on the printed circuit board 40. The conductive pattern 47b is connected to an output terminal of the signal transmission control circuit 41. It is to be noted that, in the present embodiment, the position indicator 1 acts as a position indicator of the passive type which does not transmit a stylus position signal, and in this case, the center electrode 7 plays a role for sucking up charge from a conductor of the position detection system 2 via a capacitive coupling portion.

The peripheral electrode 6 is provided around the center electrode 7. The combination of the peripheral electrode 6 and the center electrode 7 is for a position indicator of the improved type of the passive type described hereinabove. In the present embodiment, a shield member 8 for effectively preventing electric interference between the peripheral electrode 6 and the center electrode 7 is provided between the peripheral electrode 6 and the center electrode 7. The shield member 8 in the present embodiment is provided so as to surround the center electrode 7. Consequently, the shield member 8 is interposed between the peripheral electrode 6 and the center electrode 7 to minimize the coupling capacitance between the peripheral electrode 6 and the center electrode 7.

It is to be noted that also the center electrode 7 and the peripheral electrode 6 configure a communication circuit (second communication circuit), and although it is described in the foregoing description that the center electrode 7 configures a transmission circuit (second transmission circuit) and the peripheral electrode 6 configures a reception circuit (second reception circuit), the peripheral electrode 6 and the center electrode 7 may otherwise be configured such that the center electrode 7 configures a reception circuit (second reception circuit) and the peripheral electrode 6 configures a transmission circuit (second transmission circuit).

The center electrode 7 as a core member is fitted, at an end portion thereof on the opposite side to the side on which it projects to the outside, with the pen pressure detection circuit 9 disposed in the hollow portion of the housing 3 such that it is locked in the hollow portion of the housing 3 of the position indicator 1. It is to be noted that, as hereinafter described, the center electrode 7 is configured such that, if it is pulled out, then it is brought out of fitting with the pen pressure detection circuit 9. In other words, the center electrode 7 as a core member can be replaced from the position indicator 1.

The pen pressure detection circuit 9 is configured, in the present example, as a variable capacitor which demonstrates a capacitance corresponding to a pressure (pen pressure) applied to the center electrode 7 as a core member (refer to, for example, Japanese Patent Laid-Open No. 2011-186803). The electrodes at the opposite ends of the variable capacitor configuring the pen pressure detection circuit 9 are connected, in FIG. 2A, to the signal transmission control circuit 41 by the conductive pattern 47c.

The signal transmission control circuit 41 performs determination control in regard to which one of a plurality of configuration types (modes) is to be applied to the position indicator 1 of the present embodiment on the basis of information received from the outside via the wireless communication circuit 42 or information received via the peripheral electrode 6. Further, the signal transmission control circuit 41 performs transmission control of a stylus position signal through the center electrode 7 on the basis of the determination control. Furthermore, the signal transmission control circuit 41 performs transmission control of additional information through the center electrode 7 or the wireless communication circuit 42.

[Initial Setting of Position Indicator 1 of Embodiment and Synchronization Based on Signal from Position Detection System]

In the present embodiment, as the position detection system 2 to be used with the position indicator 1, those of a plurality of configuration types such as the passive type, the improved type of the passive type and the active type are available as described hereinabove. In the present embodiment, where the position detection system 2 includes a wireless communication circuit capable of communicating with the wireless communication circuit 42 of the position indicator 1, pen type information indicative of a configuration type with which the position detection system 2 can act is transmitted to the position indicator 1 by the wireless communication circuit. The position indicator 1 receives the pen type information from the position detection system using the reception function of the wireless communication circuit 42 (example of a reception function of the communication circuit), determines, on the basis of the received pen type information, to which one of the configuration types (modes) the position indicator is to be set, and initially sets so that the position indicator 1 has a configuration of a position indicator of the determined configuration type.

In the case of a position indicator of the configuration type of the passive type or the improved type of the passive type in which a transmission signal from the position detection system 2 side is received, the position indicator 1 determines to which one of the configuration types the position indicator is to be set by receiving a signal from the position detection system through the peripheral electrode 6 (example of the reception function of the communication circuit), whereafter an initial setting is performed so that the position indicator has a configuration of the determined type.

In this case, the passive type and the improved type of the passive type have a difference in frequency of a signal from the position detection system and a difference in signal contents (difference in spread code, difference in modulation method and so forth). Therefore, the position indicator 1 decides the differences and determines which configuration type the position indicator is to have from a result of the decision. In this case, also when information indicating a configuration type cannot be acquired from the position detection system via the wireless communication circuit 42, it can be decided which configuration type (mode) the position indicator is to have.

The signal transmission control circuit 41 of the position indicator 1 performs an initial setting based on a determination process of the configuration type (mode) of the position indicator 1 on the basis of information received from the position detection system 2 via the wireless communication circuit 42 or a signal received via the peripheral electrode 6 as described hereinabove. The signal transmission control circuit 41 performs a process for controlling the position indicator 1 to perform, in the initially set configuration type (mode), transmission of a stylus position signal and additional information synchronized with a signal received from the position detection system via the wireless communication circuit 42 or the peripheral electrode 6.

Now, a process for the initial setting and the synchronization described above in a case in which the position indicator 1 performs an initial setting on the basis of information received from the position detection system 2 via the wireless communication circuit 42 and transmits a stylus position signal and additional information to the position detection system 2 by the synchronization based on a signal received from the position detection system 2 via the wireless communication circuit 42 is described with reference to a timing chart of FIG. 3.

In the present example, the position indicator 1 transmits a signal Sp for pairing with the position detection system 2 for communication connection intermittently in a fixed period To to the position detection system 2 via the wireless communication circuit 42 as depicted in row A of FIG. 3 until after so-called pairing between the position indicator 1 and the position detection system 2, which is a state in which the position indicator 1 is connected for communication to the position detection system 2 via the wireless communication circuit 42, is completed.

After the position detection system 2 confirms reception of the signal Sp for pairing from the position indicator 1, it determines that pairing thereof with the position indicator 1 is possible and sends, in the present example, information indicating a configuration type of the position indicator which is to act together with the position detection system to the position indicator 1.

If the position indicator 1 confirms reception of the information indicating a configuration type from the position detection system via the wireless communication circuit 42 (refer to row A of FIG. 3), then it determines that pairing with the position detection system 2 is possible and performs an initial setting using the received information indicating the configuration type. In particular, in the present example, the information indicating a configuration type is an example of information for the initial setting in the position indicator 1.

This initial setting includes, for example, setting of a frequency of a signal to be sent from the position indicator 1, selection of a signal to be sent from the position indicator 1 (selection of a stylus position signal and additional information), and a transmission timing of a signal to be sent from the position indicator 1 (for example, in the case of transmission of one piece of data for each external synchronizing signal, in the case where no external synchronizing signal is available and transmission is repeated at designated intervals or in a like case).

In particular, the position indicator 1, on the basis of the information indicating a configuration type as an example of setting information from the position detection system 2, determines a frequency of a transmission signal to be transmitted from the pen tip, determines a period of a continuous signal to be transmitted from the pen tip, determines from which one of the pen tip and the wireless communication circuit 42 pen pressure information, side switch information and identification information ID are to be transmitted, and so forth and performs an initial setting process in accordance with the determinations to perform an initial setting.

It is to be noted that, in the foregoing description, the signal Sp for pairing is transmitted from the position indicator 1, and when the signal Sp is received by the position detection system 2, the position detection system 2 sends information indicating a configuration type to the position indicator 1 and then the position indicator 1 performs the initial setting process on the basis of the information indicating the configuration type. However, the position detection system 2 may transmit a signal Sp for pairing intermittently in a fixed period To to the position indicator 1 via the wireless communication circuit. In this case, the signal Sp for pairing includes information indicating a configuration type of the position indicator which is to act together with the position detection system 2.

In this case, when the position indicator 1 receives the signal Sp from the position detection system via the wireless communication circuit 42, it performs the initial setting process using the information indicating the configuration type included in the signal Sp. Then, after the initial setting process is completed, the position indicator 1 transmits a response signifying that the signal Sp for pairing is received and pairing is completed to the position detection system 2.

If pairing is performed in such a manner as described above and the initial setting process in the position indicator 1 is completed, then the position indicator 1 prepares to start transmission of a stylus position signal and additional information to the position detection system in accordance with the initial setting process. Further, if the position detection system 2 recognizes that pairing with the position indicator 1 is possible, then it stops the transmission of the signal Sp via the wireless communication circuit and instead sends a reference signal (external synchronizing signal) for a transmission timing of a signal from the position indicator 1 to the position indicator 1 via the wireless communication circuit.

The transmission of a stylus position signal and additional information from the position indicator 1 to the position detection system 2 is performed in synchronism with a signal (external synchronizing signal) from the position detection system received by the wireless communication circuit 42. Consequently, in the position detection system, a signal from the position indicator 1 can be received with certainty and accuracy.

<Example of Establishment of Synchronism>

Several examples of how to establish synchronism between the position indicator 1 and the position detection system 2 after pairing between the position indicator 1 and the position detection system 2 is established are described with reference to rows B, C, and D of FIG. 3. It is to be noted that the examples of rows B and C of FIG. 3 are directed to a case in which the position indicator 1 transmits all of a stylus position signal and additional information to the position detection system 2 via the center electrode 7 (or the peripheral electrode 6), and the example of row D of FIG. 3 is directed to another case in which a stylus position signal and pen pressure information within additional information are sent to the position detection system 2 via the center electrode 7 (or the peripheral electrode 6) while identification information ID is sent to the position detection system 2 via the wireless communication circuit 42.

First Example

In the first example, the position detection system 2 transmits, after pairing with the position indicator 1, an external synchronizing signal SYC, for example, in a predetermined period via the wireless communication circuit. When the position indicator 1 receives the external synchronizing signal SYC as depicted in row B of FIG. 3, it transmits, on the basis of the reception, a stylus position signal (burst signal) and additional information to the position detection system 2 via the center electrode 7 (or the peripheral electrode 6).

It is to be noted that, also in this first example, all of additional information may not be transmitted to the position detection system 2 via the center electrode 7 (or the peripheral electrode 6) but part of the additional information such as identification information ID or all of the additional information may be transmitted to the position detection system 2 via the wireless communication circuit 42 at a timing based on the external synchronizing signal SYC.

After the external synchronizing signal SYC is sent, the position detection system 2 may receive a stylus position signal and additional information sent thereto from the position indicator 1 at a timing synchronized with the external synchronizing signal, and therefore, the position detection system 2 can acquire a signal from the position indicator 1 with accuracy. It is to be noted that additional information may not always be sent together with a stylus position signal but may be sent at predetermined intervals.

Second Example

In the present second example, the position indicator 1 transmits a stylus position signal (burst signal) and additional information to the position detection system 2 via the center electrode 7 (or the peripheral electrode 6) on the basis of the external synchronizing signal SYC from the position detection system 2 similarly as in the first example. However, in the present second example, a timing signal generation circuit for generating a signal synchronized with the external synchronizing signal SYC from the position detection system 2 is provided. Therefore, the position detection system 2 need not transmit the external synchronizing signal SYC at every timing at which the position indicator 1 is to transmit a stylus position signal and additional information but can transmit the external synchronizing signal SYC at predetermined time intervals as depicted in row C of FIG. 3.

In the present second example, the oscillator of the position detection system and the oscillator of the timing signal generation circuit of the position indicator 1 operate with frequencies substantially equal to each other. However, the difference in frequency gradually displaces timings of them as time passes. The transmission interval of the external synchronizing signal SYC from the position detection system 2 is set so as to be equal to or smaller than an interval within which the timing displacement falls within a displacement which does not have an influence on the action.

Third Example

The first example and the second example described above are directed to an example wherein the reception timing of the external synchronizing signal SYC and the transmission timing of a stylus position signal and additional information do not overlap with each other in the position indicator 1. However, if the position indicator 1 is configured such that it includes a timing signal generation circuit for generating a signal synchronized with the external synchronizing signal SYC from the position detection system 2 similarly as in the second example, then the reception timing of the external synchronizing signal SYC and the transmission timing of a stylus position signal and additional information may overlap with each other. The third example is an example in this case.

In particular, in the present third example, the position indicator 1 includes a timing signal generation circuit for generating a signal synchronized with the external synchronizing signal SYC from the position detection system 2 as depicted in row D of FIG. 3. Then, the signal from this timing signal generation circuit is used to set a transmission timing of a stylus position signal and additional information in a next cycle to a timing synchronized with the external synchronizing signal SYC.

With the present third example, it is possible to raise the transfer rate of a stylus position signal and additional information. It is to be noted that, also in the present third example, the position detection system 2 need not transmit the external synchronizing signal SYC in accordance with a transmission timing of a stylus position signal and additional information from the position indicator 1 but may transmit the external synchronizing signal SYC after time intervals.

It is to be noted that, in the first to third examples described above, the position indicator 1 receives an external synchronizing signal SYC from the position detection system 2 and transmits a stylus position signal and additional information at a timing synchronized with the received external synchronizing signal SYC. However, a synchronizing signal for conveying a timing at which a stylus position signal and additional information are to be transmitted may be transmitted from the position indicator 1 to the position detection system 2 such that the position detection system 2 receives a signal transmitted thereto from the position indicator 1 on the basis of the synchronizing signal from the position indicator 1.

It is to be noted that, in addition to the example described above, there may be a case in which synchronization based on a synchronizing signal using a wireless communication circuit is not performed between the position indicator 1 and the position detection system 2. Action in this case is described.

1. In a case where, although the position detection system 2 has a wireless communication circuit and transmits setting information for the initial setting in the position indicator 1 (for example, information indicating a configuration type), no synchronization is performed.

In this case, although pairing between the position indicator 1 and the position detection system 2 is established and exchange of information for the initial setting is performed using the wireless communication circuit, since no synchronization is performed, signal transmission from the position indicator 1 is started on the basis of initial setting information.

2. In another case where the position detection system 2 does not have a wireless communication circuit and setting information is transmitted from a sensor to the position indicator 1.

In this case, the reception circuit configured from the center electrode 7 or the peripheral electrode 6 on the pen tip side of the position indicator 1 receives a signal from the sensor of the position detection system 2 and performs the initial setting and then starts communication with the position detection system 2.

3. In a further case where the position detection system 2 does not have a wireless communication circuit and setting information is not transmitted from the sensor.

In this case, the position indicator 1 and the position detection system 2 cannot perform pairing, and the position indicator 1 begins to transmit a signal on the basis of a default value set (stored) in advance in the position indicator 1.

[Description of Example of Configuration of Internal Electronic Circuit of Position Indicator 1 of Embodiment]

Figure 4:
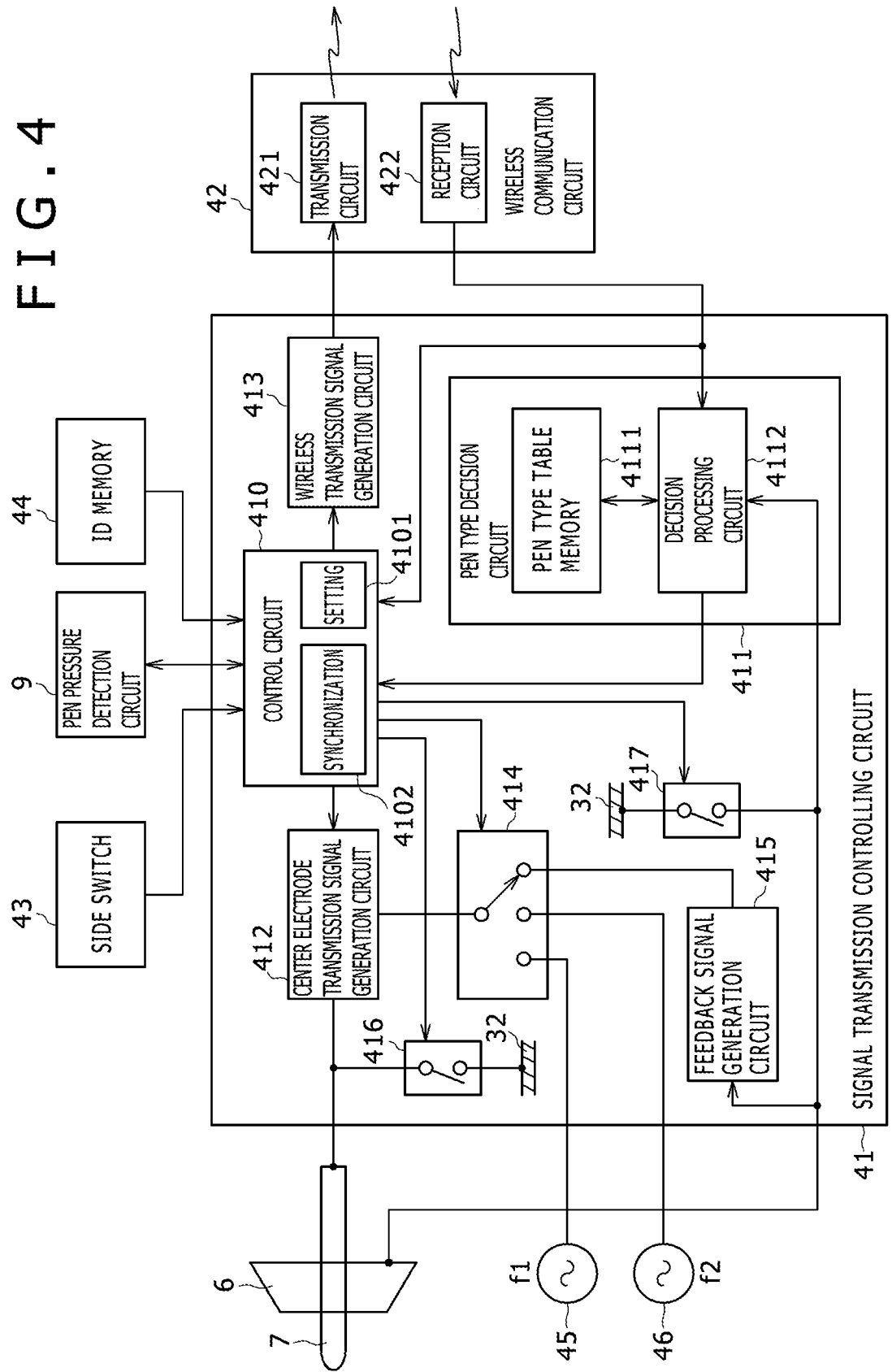
FIG. 4 is a block diagram of a position indicator according to one or more embodiments of the present disclosure.

FIG. 4 is a block diagram depicting a configuration of an electronic circuit formed on the printed circuit board 40 in the housing 3 of the position indicator 1 of the present embodiment and is a view principally depicting an example of a detailed internal configuration of the signal transmission control circuit 41.

As depicted in FIG. 4, the signal transmission control circuit 41 is configured including a control circuit 410 configured, for example, from an IC (Integrated Circuit) or microprocessor, a pen type decision circuit 411, a center electrode transmission signal generation circuit 412, a wireless transmission signal generation circuit 413, a switch circuit 414 for stylus position signal selection, a feedback signal generation circuit 415, a position indicator of the passive type, and switch circuits 416 and 417 for switching between position indicators of the improved type of the passive type and the active type.

The control circuit 410 includes, as circuits thereof, a configuration setting circuit 4101 for performing the initial setting process described hereinabove, and a synchronization circuit 4102 for causing a transmission signal to be transmitted in synchronism with the external synchronizing signal SYC from the position detection system 2.

The variable capacitor configured from the pen pressure detection circuit 9 is connected to the control circuit 410, and the control circuit 410 calculates a pressure (pen pressure value) applied to the center electrode 7 from the capacitance of the variable capacitor configured from the pen pressure detection circuit 9. Further, an on-off status signal of the side switch 43 is supplied to the control circuit 410. The control circuit 410 generates side switch information which is additional information relating to the side switch 43 from the on-off status signal of the side switch 43. Further, the ID memory 44 is connected to the control circuit 410, and the control circuit 410 reads out and acquires identification information (ID) of the position indicator 1 from the ID memory 44 as occasion demands. It is to be noted that the ID memory 44 which stores identification information in advance may be accommodated in the position indicator 1 or may be configured such that identification information which is stored contents of the ID memory 44 is rewritten, for example, in accordance with a command from the position detection system 2 received via the wireless communication circuit 42.

The configuration setting circuit 4101 of the control circuit 410 performs an initial setting process regarding whether a plurality of types of additional information, in the present example, pen pressure information, side switch information and identification information, are to be sent from the center electrode 7 or to be sent by wireless transmission from the wireless communication circuit 42 in response to information based on a result of the pen type decision from the pen type decision circuit 411.

The control circuit 410 supplies, on the basis of the initial setting process, additional information to be sent via the center electrode 7 to the center electrode transmission signal generation circuit 412 and supplies additional information to be sent via the wireless communication circuit 42 to the wireless transmission signal generation circuit 413.

The center electrode transmission signal generation circuit 412 is connected to the center electrode 7 and transmits additional information to be sent to the position detection system 2 via the center electrode 7 together with a stylus position signal as hereinafter described. The wireless transmission signal generation circuit 413 is connected to a transmission circuit 421 of the wireless communication circuit 42, and additional information to be sent is transmitted by wireless transmission to the position detection system 2 via the transmission circuit 421. In this case, the control circuit 410 receives the external synchronizing signal SYC from the position detection system 2 via a reception circuit 422 of the wireless communication circuit 42 and controls, by the synchronization circuit 4102, based on the received external synchronizing signal SYC such that a stylus position signal and additional information are transmitted from the center electrode transmission signal generation circuit 412 via the center electrode 7 or additional information is transmitted from the wireless transmission signal generation circuit 413 via the transmission circuit 421 of the wireless communication circuit 42.

To the center electrode transmission signal generation circuit 412, an alternating signal of the frequency f1 from the oscillator 45 or an alternating signal of the frequency f2 from the oscillator 46 is supplied as a signal for generating a stylus position signal to be sent in response to switching selection of the switch circuit 414 by the control circuit 410 and a feedback signal from the feedback signal generation circuit 415 is supplied as a stylus position signal to be sent. The feedback signal generation circuit 415 performs signal enhancement of a signal received from the position detection system 2 via the peripheral electrode 6 by amplification and further performs phase inversion in the present example. An example of a configuration and a process of the feedback signal generation circuit 415 is hereinafter described in detail. The control circuit 410 generates a switching selection signal for the switch circuit 414 on the basis of initial setting information set on the basis of a result of a pen type decision from the pen type decision circuit 411.

A connection portion of the center electrode transmission signal generation circuit 412 to the center electrode 7 is connected to the conductor portion 32 of the housing 3 via the switch circuit 416. Meanwhile, the peripheral electrode 6 is connected to the conductor portion 32 of the housing 3 via the switch circuit 417. The switch circuits 416 and 417 are switched in accordance with an on/off controlling signal from the control circuit 410. The control circuit 410 generates on/off controlling signals for the switch circuits 416 and 417 on the basis of initial setting information set on the basis of a result of the pen type decision from the pen type decision circuit 411.

The pen type decision circuit 411 is configured from a pen type table memory 4111 and a decision processing circuit 4112. To the decision processing circuit 4112 of the pen type decision circuit 411, information from the position detection system 2 received by the reception circuit 422 of the wireless communication circuit 42 is supplied and a signal received from the position detection system 2 via the peripheral electrode 6 is supplied.

In the pen type table memory 4111, a plurality of different configuration types for the position indicator 1 and, for the position indicator of each of the configuration types, whether a stylus position signal is to be sent and a frequency of an oscillator for generating a stylus position signal to be sent as well as pen type table information regarding whether additional information is to be sent from the center electrode 7 or via the wireless communication circuit 42 are stored. Although this pen type table information may be stored in advance in the pen type table memory 4111, it is configured in the present example such that writing into and rewriting of the pen type table information can be performed by a command from the position detection system 2 via the wireless communication circuit 42.

The decision processing circuit 4112 discriminates information from the position detection system 2 received by the reception circuit 422 of the wireless communication circuit 42 or a signal received from the sensor circuit of the position detection system 2 via the peripheral electrode 6 and refers to the pen type table information of the pen type table memory 4111 to discriminate a configuration type for a position indicator compatible with the position detection system 2 to be used together with the position indicator 1. Then, the decision processing circuit 4112 generates information regarding whether or not there is a signal to be sent from the center electrode 7, information regarding what is a stylus position signal and additional information to be sent from the center electrode 7 and information regarding what is additional information to be transmitted via the wireless communication circuit 42 and supplies the generated information to the control circuit 410.

The control circuit 410 generates a switch selection signal for the switch circuit 414 and on-off controlling signals for the switch circuits 416 and 417 on the basis of the initial setting set on the basis of information from the pen type decision circuit 411 and supplies the generated signals to the switch circuits 414, 416 and 417. Further, the control circuit 410 determines additional information to be supplied to the center electrode transmission signal generation circuit 412 and additional information to be supplied to the wireless transmission signal generation circuit 413 and supplies the determined additional information to them, respectively.

FIG. 5 depicts an example of the pen type table information in the pen type decision circuit 411. The example of FIG. 5 is table information regarding five different types of position indicators, including a configuration type 1 to a configuration type 5 (mode 1 to mode 5). After the configuration type (mode) for a position indicator is determined, the pen type decision circuit 411 refers to the pen type table information to generate control information to be supplied to the control circuit 410. In the following, that the configuration types (modes) are configured by switching control by the control circuit 410 in the position indicator 1 of the present embodiment is described.

The configuration type 1 (mode 1) is a position indicator of the passive type, and in the configuration type 1 (mode 1), no signal is transmitted from the center electrode 7 while all additional information is transmitted via the wireless communication circuit 42. In particular, in the signal transmission control circuit 41 of the position indicator 1, if the pen type decision circuit 411 decides the configuration type 1 (mode 1), then the control circuit 410 switches on the switch circuits 416 and 417, and places the center electrode transmission signal generation circuit 412 into an inactive state. The switch circuit 417 may be off. Then, the control circuit 410 causes the transmission circuit 421 of the wireless communication circuit 42 to transmit all additional information to the position detection system 2 via the wireless transmission signal generation circuit 413. It is to be noted that identification information need not occasionally be transmitted as additional information.

The configuration type 2 (mode 2) is a position indicator of the improved type of the passive type. If the pen type decision circuit 411 decides this configuration type 2 (mode 2), then the control circuit 410 switches off the switch circuits 416 and 417 on the basis of the information from the pen type decision circuit 411 and switches the switch circuit 414 to a state in which it selects a signal from the feedback signal generation circuit 415. Then, additional information is controlled by the control circuit 410 so that all of it is transmitted from the transmission circuit 421 of the wireless communication circuit 42 to the position detection system 2 via the wireless transmission signal generation circuit 413. It is to be noted that identification information need not occasionally be transmitted as additional information.

The configuration type 3 (mode 3) is a first type of a position indicator of the active type. If the pen type decision circuit 411 decides this configuration type 3 (mode 3), then the control circuit 410 switches off the switch circuit 416 and switches on the switch circuit 417 on the basis of the information from the pen type decision circuit 411 and switches the switch circuit 414, in the present example, to a state in which it selects an alternating signal from the oscillator 45 of the frequency f1. Then, the control circuit 410 causes the transmission circuit 421 of the wireless communication circuit 42 to transmit all additional information to the position detection system 2 via the wireless transmission signal generation circuit 413. It is to be noted that identification information need not occasionally be transmitted as additional information.

The configuration type 4 (mode 4) is a second type of a position indicator of the active type. If the pen type decision circuit 411 decides the configuration type 4 (mode 4), then the control circuit 410 switches off the switch circuit 416 and switches on the switch circuit 417 on the basis of the information from the pen type decision circuit 411 and switches the switch circuit 414, in the present example, to a state in which it selects an alternating signal from the oscillator 46 of the frequency f2. Then, pen pressure information and side switch information from within additional information are sent from the center electrode 7 together with a stylus position signal while identification information ID is controlled so as to be transmitted from the transmission circuit 421 of the wireless communication circuit 42 to the position detection system 2 via the wireless transmission signal generation circuit 413.

The configuration type 5 (mode 5) is a third type of a position indicator of the active type. If the pen type decision circuit 411 decides this configuration type 5 (mode 5), then the control circuit 410 switches off the switch circuit 416 and switches on the switch circuit 417 on the basis of the information from the pen type decision circuit 411 and switches the switch circuit 414, in the present example, to a state in which it selects an alternating signal from the oscillator 46 of the frequency f2. Then, all additional information is controlled so as to be transmitted from the center electrode 7 together with a stylus position signal.

The signal transmission control circuit 41 decides a configuration type of a position indicator on the basis of information and a signal received from the reception circuit 422 of the wireless communication circuit 42 and the sensor circuit of the position detection system 2 via the peripheral electrode 6 and controls the position indicator 1 so as to have a configuration of a position indicator of the decided configuration type in such a manner as described above.

Accordingly, the position indicator 1 of the present embodiment can automatically configure itself according to various configuration types compatible with position detection systems 2 of various types. In other words, only the position indicator 1 of the present embodiment is needed to input a position indication to a plurality of position detection systems 2 of various types. Therefore, there is no necessity to prepare different position indicators for individual ones of a plurality of position detection systems 2 of various types, which is very convenient, and to the user, also the burden in regard to the cost is reduced.

It is to be noted that the pen type information from the position detection system 2 received via the wireless communication circuit 42 is not limited to information of configuration types for directly identifying the configuration types 1 to 5, but may be numbers of the configuration types 1 to 5 in the pen type table information or information indirectly indicating addresses of the configuration types in the pen type table memory 4111, for example.

It is to be noted that, in FIG. 4, the processing functions of the decision processing circuit 4112 of the pen type decision circuit 411, the center electrode transmission signal generation circuit 412 and the wireless transmission signal generation circuit 413 can be configured also as software executed by the control circuit 410. This similarly applies also to the feedback signal generation circuit 415.

[Example of Processing Action of Signal Transmission Control Circuit 41]

Now, an example of processing actions performed by the signal transmission control circuit 41 after the power supply switch 48 is switched on is described with reference to the flow charts of FIGS. 6 and 7.

The signal transmission control circuit 41 first decides whether or not information is received by the reception circuit 422 of the wireless communication circuit 42 (S1) and decides, if it decides that information is received, whether or not the received information is pen type information (S2). If it is decided at S2 that the received information is pen type information, then the signal transmission control circuit 41 decides a configuration type (pen type) of a position indicator on the basis of the received pen type information and refers to the pen type table memory 4111 to determine signals to be transmitted from the center electrode 7 and the transmission circuit 421 of the wireless communication circuit 42, and performs an initial setting process (S3). This initial setting process includes also setting regarding whether or not a stylus position signal is to be transmitted from the center electrode 7 described hereinabove.

Next, after S3, the signal transmission control circuit 41 performs signal transmission based on the initial setting process in accordance with the configuration type decided at S3 via the center electrode 7 and the transmission circuit 421 of the wireless communication circuit 42 (S4).

Then, the signal transmission control circuit 41 decides whether or not it is impossible to receive information from the position detection system 2 via the reception circuit 422 of the wireless communication circuit 42 (S5) and returns, if it is decided that it is not impossible to receive information, the processing to S4 to continue the signal transmission in accordance with the decided configuration type.

If it is decided at S5 that it is impossible to receive information from the position detection system 2 via the reception circuit 422 of the wireless communication circuit 42, then the signal transmission control circuit 41 decides whether or not a predetermined period of time or more has elapsed after it became impossible to receive information (S6). If it is decided at S6 that the predetermined period of time or more has not elapsed, then the signal transmission control circuit 41 returns the processing to S4 to continue the signal transmission in accordance with the decided configuration type.

If it is decided at S6 that the predetermined period of time or more has elapsed, then the signal transmission control circuit 41 stops the signal transmission from the center electrode 7 and the transmission circuit 421 of the wireless communication circuit 42 and places the position indicator 1 into a sleep state (S7). In this sleep state, in order to reduce the dissipation of the battery 5 as far as possible to achieve power saving, while supply of power to the reception circuit 422 of the wireless communication circuit 42 and the control circuit 410 and the pen type decision circuit 411 of the signal transmission control circuit 41 is maintained, useless voltage supply to the other circuits is stopped.

Then, subsequently to S7, the signal transmission control circuit 41 returns the processing to step S1 to repeat the processes at the steps beginning with step S1 described above.

Figure 7:
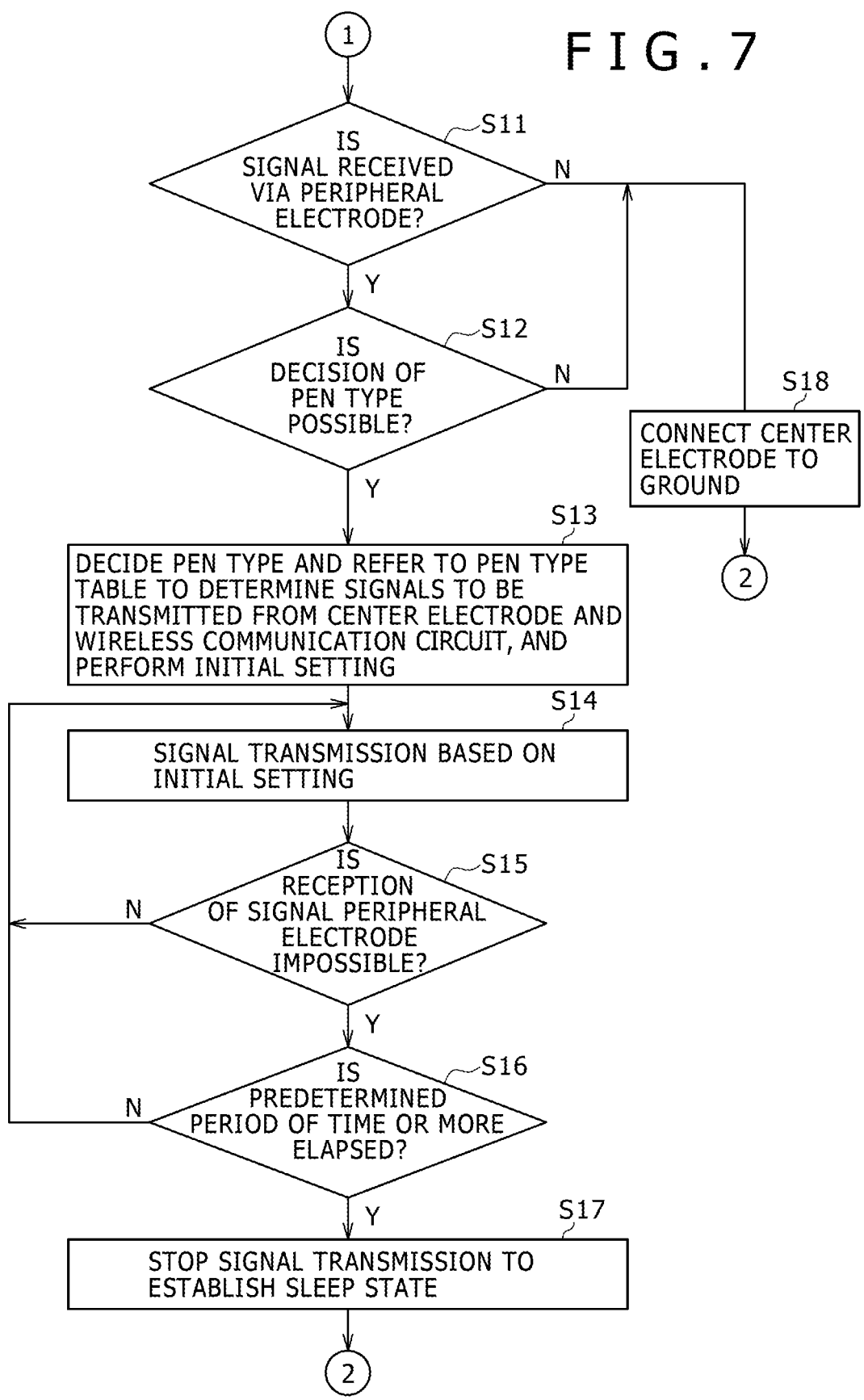
FIG. 7 is a flow chart illustrating the example of a processing flow of a position indicator according to one or more embodiments of the present disclosure.

If it is decided at S1 that information is not received by the reception circuit 422 of the wireless communication circuit 42 or if it is decided at S2 that the received information is not pen type information, then the signal transmission control circuit 41 decides whether or not a signal is received via the peripheral electrode 6 (S11 of FIG. 7). If it is decided at S11 that a signal is not received via the peripheral electrode 6, then the signal transmission control circuit 41 switches on the switch circuit 416 to connect the center electrode 7 to the grounding conductor (ground) of the printed circuit board 40 via the conductor portion 32 to establish a state of the configuration type 1 (S18). Then, after S18, the signal transmission control circuit 41 returns the processing to S1 of FIG. 6 to repeat the processes beginning with S1.

Then, if it is decided at S11 that a signal is received via the peripheral electrode 6, then it is decided whether or not decision of a pen type from the reception signal is possible (S12). If it is decided at S12 that decision of a pen type is not possible, then the signal transmission control circuit 41 switches on the switch circuit 416 to connect the center electrode 7 to the grounding conductor (ground) of the printed circuit board 40 via the conductor portion 32 to establish a state of the configuration type 1 (S18). Then, after S18, the signal transmission control circuit 41 returns the processing to S1 of FIG. 6 to repeat the processes beginning with S1.

If it is decided at S12 that decision of a pen type is possible, then the signal transmission control circuit 41 decides a configuration type (pen type) of the position indicator on the basis of the received signal and refers to the pen type table memory 4111 to determine signals to be transmitted from the center electrode 7 and the transmission circuit 421 of the wireless communication circuit 42, and performs an initial setting process (S13). This initial setting process includes setting also of whether or not a stylus position signal is to be transmitted from the center electrode 7 as described hereinabove.

Next, after S13, the signal transmission control circuit 41 executes signal transmission based on the initial setting process in accordance with the configuration type decided at S13 via the center electrode 7 and the transmission circuit 421 of the wireless communication circuit 42 (S14).

Then, the signal transmission control circuit 41 decides whether or not it is impossible to receive a signal via the peripheral electrode 6 (S15), and returns, when it is decided that it is not impossible to receive a signal, the processing to S14 to continue the signal transmission in accordance with the decided configuration type.

If it is decided at S15 that it is impossible to receive a signal via the peripheral electrode 6, then the signal transmission control circuit 41 decides whether or not a predetermined period of time or more has elapsed after it became impossible to receive a signal (S16). If it is decided at S16 that the predetermined period of time or more has not elapsed, then the signal transmission control circuit 41 returns the processing to S14 to continue the signal transmission in accordance with the decided configuration type.

If it is decided at step that the predetermine time period or more has elapsed, then the signal transmission control circuit 41 stops the signal transmission from the center electrode 7 and the transmission circuit 421 of the wireless communication circuit 42 and places the position indicator 1 into a sleep state (S17). Then, after S17, the signal transmission control circuit 41 returns the processing to S1 to repeat the processes beginning with S1 described hereinabove.

[Description of Action of Position Indicator of Configuration Type and Corresponding Position Detection System]

<Position Indicator 1A of Configuration Type 2 and Corresponding Position Detection System 2A>

Figure 8:
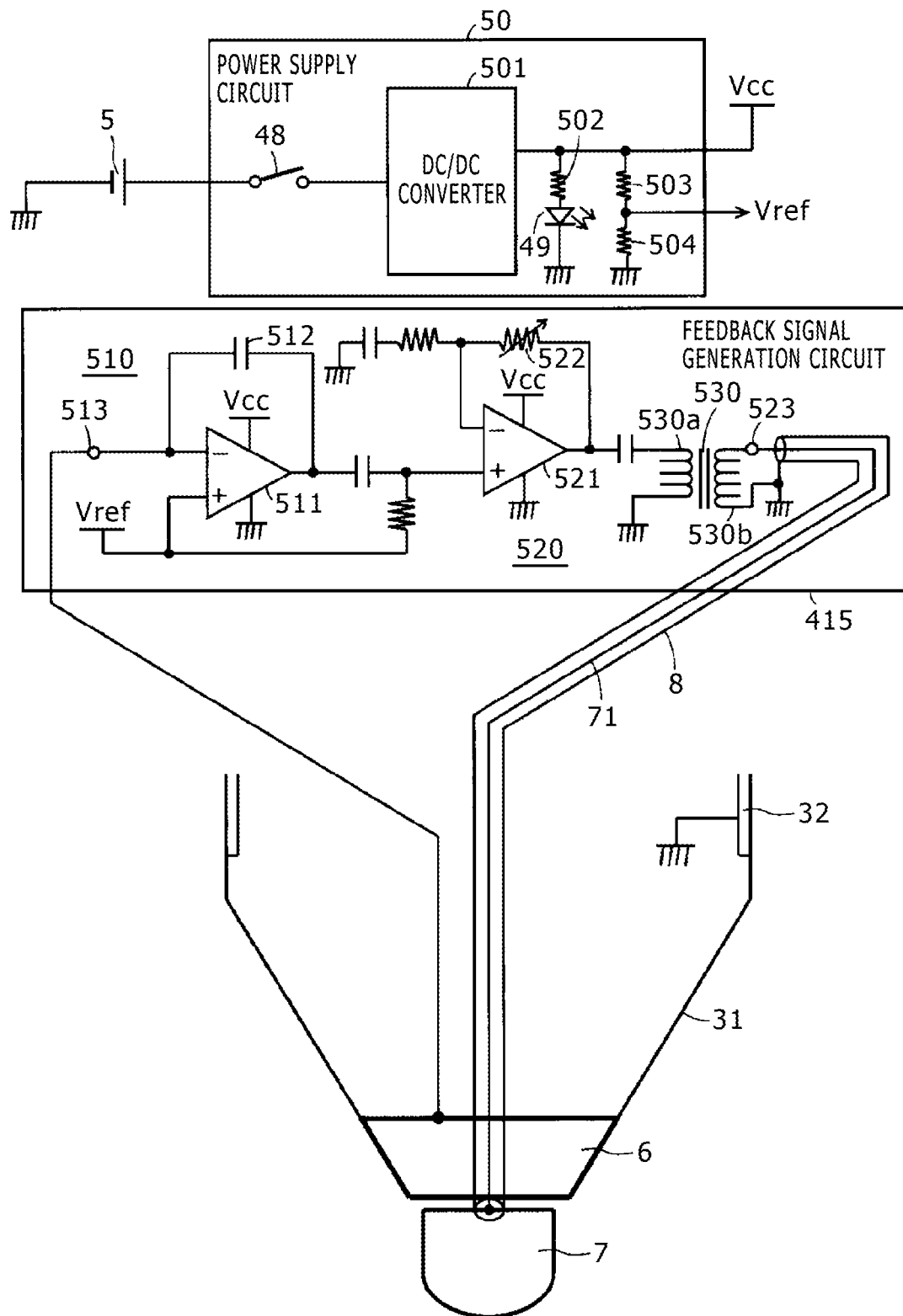
FIG. 8 is a view illustrating an example of a position indicator having a configuration type that can be configured according to one or more embodiments of the present disclosure.

FIG. 8 is a view depicting an example of a circuit of major part of a position indicator 1A of the configuration type 2 and particularly depicts an example of a circuit configuration of a feedback signal generation circuit 415 and an example of a circuit configuration of a power supply circuit 50 whose description is omitted in the foregoing description.

The power supply circuit 50 includes a DC/DC converter 501, which generates a power supply voltage +Vcc from the voltage of the battery 5 and supplies the power supply voltage +Vcc to the signal transmission control circuit 41 and other circuits.

In the power supply circuit 50, the power supply switch 48 is provided between the DC/DC converter 501 and the battery 5. Further, a series circuit of a resistor 502 and the LED 49 is connected between an output terminal of the DC/DC converter 501 and the grounding conductor. Furthermore, the output terminal of the DC/DC converter 501 is connected to the grounding conductor via a series connection of a resistor 503 and another resistor 504, and a reference voltage Vref (=Vcc/2) is outputted from a connection point of the resistor 503 and the resistor 504.

The feedback signal generation circuit 415 is configured, in the present example, as a signal enhancement processing circuit and is configured from a sense amplifier 510, a signal amplification factor variation circuit 520 and a transformer 530.

In the present example, the sense amplifier 510 is configured from an operational amplifier 511, and a capacitor 512 connected between an inverting input terminal and an output terminal of the operational amplifier 511. The inverting input terminal of the operational amplifier 511 is connected to a connection terminal 513 connected to the peripheral electrode 6. Meanwhile, to a non-inverting input terminal of the operational amplifier 511, the reference voltage Vref described hereinabove is supplied.

When the position indicator 1A is disposed on a position detection system 2A, the peripheral electrode 6 of the position indicator 1A and the position detection system 2A are coupled to each other via a capacitance C1 as depicted in FIG. 1. Since an alternating signal flows to the position detection system 2A as hereinafter described, this alternating signal is supplied as a current signal to the connection terminal 513 via the capacitance C1 and the peripheral electrode 6 and is inputted to the sense amplifier 510. The capacitor 512 is provided for detecting the current signal inputted via the capacitance C1.

Then, the sense amplifier 510 phase-inverts the alternating signal inputted as a current signal via the connection terminal 513 and outputs the resulting alternating signal to the signal amplification factor variation circuit 520.

The signal amplification factor variation circuit 520 is configured from an operational amplifier 521, and a variable resistor 522 connected between an inverting input terminal and an output terminal of the operational amplifier 521. By variably setting the resistance value of the variable resistor 522, an amplification factor of the operational amplifier 521 is variably set, and as a result, a signal detection sensitivity of the position indicator 1A is controlled.

The alternating signal amplified by the signal amplification factor variation circuit 520 is supplied to a primary winding 530a of the transformer 530. The ratio between a number n1 of turns of the primary winding 530a and a number n2 of turns of a secondary winding 530b of the transformer 530 is set such that the number of turns of the secondary winding 530b is higher (n1<n2), for example, like n1:n2=1:10. Accordingly, on the secondary winding 530b side of the transformer 530, an alternating signal (voltage signal) of an increased amplitude is obtained by multiplication of the amplitude of an output signal of the signal amplification factor variation circuit 520 in accordance with the winding ratio.

The secondary winding 530b of the transformer 530 is connected at one terminal thereof to a connection terminal 523 connected to a core member 71 formed from a bar-like conductor of the center electrode 7 shielded by the shield member 8. The secondary winding 530b of the transformer 530 is connected at the other terminal thereof to the grounding conductor of the printed circuit board 40. Accordingly, an output signal formed as an alternating signal voltage of an increased amplitude by the feedback signal generation circuit 415 is supplied to the center electrode 7 via the connection terminal 523.

When the position indicator 1A is disposed on the position detection system 2A, since the center electrode 7 of the position indicator 1A and the position detection system 2A are coupled to each other via a capacitance, the alternating signal is fed back from the position indicator 1A to the position detection system 2A via the center electrode 7 of the position indicator 1A.

Now, the position detection system 2A of the present example is described with reference to FIG. 9. The position detection system 2A of the present example has a configuration of a position detection system of a mutual capacitance type wherein a sensor electrode is configured from an input electrode and an output electrode and a variation of a coupling capacitance at a touch point at which the position indicator 1A contacts with the position detection system 2A is detected.

Figure 9:
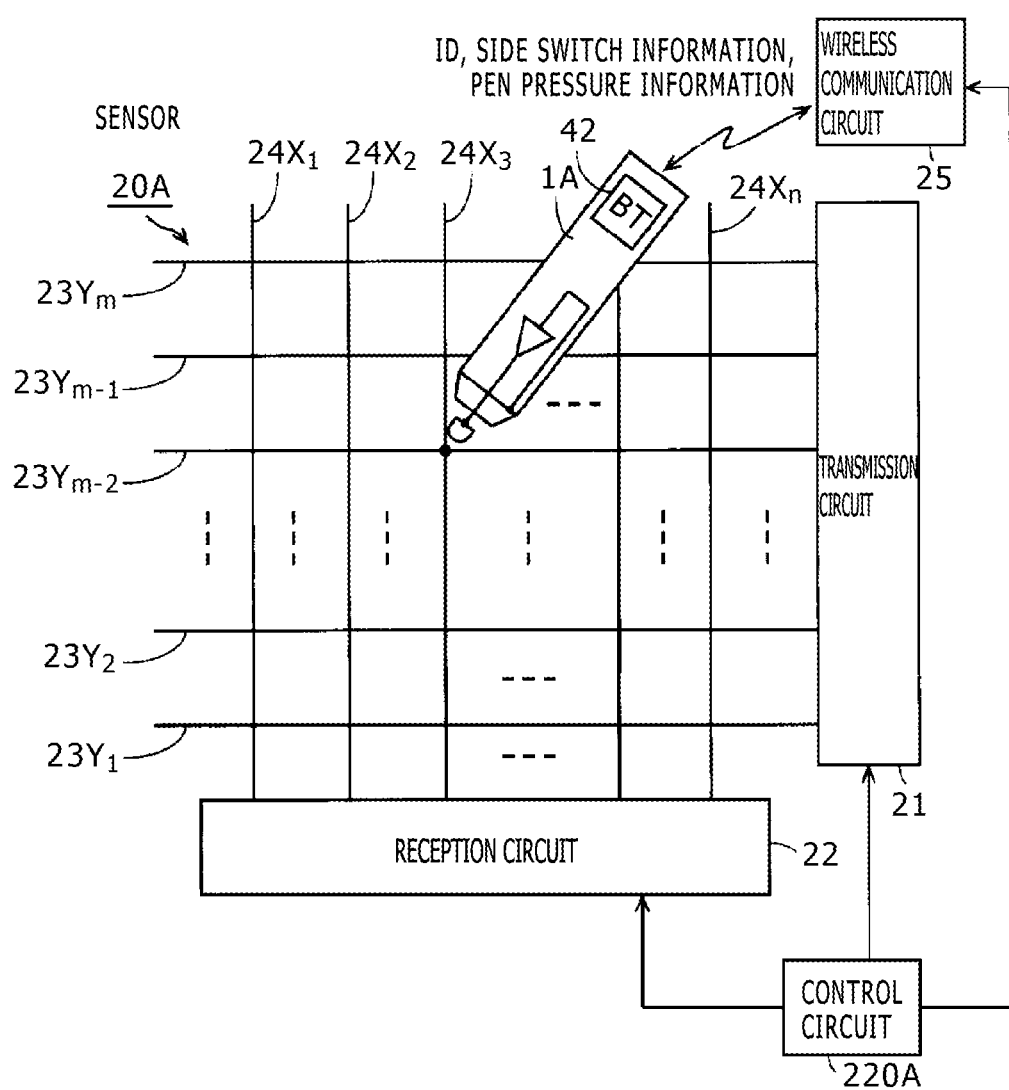
FIG. 9 is a view illustrating an example of a position indicator having a configuration type that can be configured according to one or more embodiments of the present disclosure and a corresponding position detection system.

As depicted in FIG. 9, the position detection system 2A of the present example includes a sensor 20A, a transmission circuit 21, a reception circuit 22, a wireless communication circuit 25 and a control circuit 220A. The sensor circuit 20A includes a plurality of, in the present example, m, linear transmission conductors $23Y_1, 23Y_2, \ldots,$ and $23Y_m$ (m is an integer equal to or greater than 1) extending in a horizontal direction (X axis direction) of the sensor input face, and a plurality of, in the present example, n, reception conductors $24X_1, 24X_2, \ldots,$ and $24X_n$ (n is an integer equal to or greater than 1) extending in a vertical direction (Y axis direction) of the sensor input face orthogonal to the transmission conductors $23Y_1$ to $23Y_m$. The plurality of transmission conductors $23Y_1$ to $23Y_m$ are disposed at equal distances in the Y axis direction and connected to the transmission circuit 21. Meanwhile, the plurality of reception conductors $24X_1$ to $24X_n$ are disposed at equal distances in the X axis direction and are connected to the reception circuit 22.

It is to be noted that, in the following description of the present specification, when there is no necessity to individually distinguish the transmission conductors $23Y_1$ to $23Y_m$ and the reception conductors $24X_1$ to $24X_n$, each of them is referred to as transmission conductor 23Y and reception conductor 24X.

The plurality of transmission conductors 23Y and the plurality of reception conductors 24X are individually disposed in a spaced relationship from each other and have a mutually orthogonal disposition relationship such that a plurality of intersecting points (cross points) are formed. At each cross point, it can be considered that a transmission conductor 23Y and a reception conductor 24X are coupled to each other through a predetermined capacitance.

The transmission circuit 21 supplies a predetermined alternating signal to the transmission conductors 23Y under the control of the control circuit 220A. In this case, the transmission circuit 21 may supply a same alternating signal to the plurality of transmission conductors $23Y_1$, $23Y_2$, . . . , and $23Y_m$ while they are successively switched one by one or may supply a plurality of alternating signals different from each other simultaneously to the plurality of transmission conductors $23Y_1$, $23Y_2$, . . . , and $23Y_m$. Alternatively, the plurality of transmission conductors $23Y_1$, $23Y_2$, . . . , and $23Y_m$ may be divided into plurality of groups, for which alternating signals different from one another are used.

The reception circuit 22 detects a signal component when an alternating signal supplied to a transmission conductor 23Y is transmitted to each of the reception conductors $24X_1$, $24X_2$, . . . , and $24X_n$ via the predetermined capacitance described above under the control of the control circuit 220A. If it is assumed that the coupling capacitance between a transmission conductor 23Y and a reception conductor 24X is equal at all cross points, then when the position indicator 1A is not disposed on the sensor circuit 20A, a reception signal of a predetermined level is detected from all of the reception conductors $24X_1$, $24X_2$, . . . , and $24X_n$ of the sensor circuit 20A by the reception circuit 22.

In contrast, if the position indicator 1A contacts with the sensor 20A, then a transmission conductor 23Y and a reception conductor 24X which configure a cross point at the contact position and the position indicator 1A couple to each other via the capacitance. In other words, the capacitance is varied by the position indicator 1A, and the reception signal level obtained from the reception conductor 24X at the cross point at which the position indicator 1A is disposed varies in comparison with the reception signal level at the other cross points.

The reception circuit 22 detects a reception conductor 24X which demonstrates a variation of the level of the reception signal thereof among the plurality of reception conductors $24X_1$, $24X_2$, . . . , and $24X_n$ to detect the indicated position by the position indicator 1A. Another control circuit of the position detection system 2 not depicted detects the cross point, at which the position indicator 1A contacts, by detecting the transmission conductor 23Y to which an alternating signal is supplied from the transmission circuit 21 and the reception conductor 24X at which the variation of the reception signal level is detected by the reception circuit 22.

Also when not the position indicator 1A but a finger approaches or contacts with the sensor 20A, the position detection system 2 detects the cross point approached or contacted by the finger in accordance with a similar principle. In this case, part of the alternating signal supplied to the transmission conductor 23Y flows to the ground via the finger and further via the body of the user. Therefore, the reception signal level of the reception conductor 24X which configures the cross point at which the finger is disposed varies. The reception circuit 22 detects the variation of the reception signal level to detect the reception conductor 24X which configures the cross point at which the finger is disposed.

In the case of a position indicator of the configuration type 1, the position detection system 2A can perform detection of an indicated position on the sensor 20A in accordance with a principle similar to that of position detection of a finger. However, in the case of a position indicator of the configuration type 1, since the contact area of the position indicator is not greater than that of the finger, the coupling capacitance is low and the position detection system 2A is low in detection sensitivity. Therefore, a position detection system compatible with a position indicator of the configuration type 1 compensates for a drop of the detection sensitivity by using a spread code as an alternating signal to be transmitted to the position indicator and taking the correlation between the transmission signal and the reception signal to detect the indicated position by the position indicator or the like.

In contrast, in the case of the position indicator 1A of the configuration type 2 and the position detection system 2A, even if a spread code or the like is not used, the affinity between the position indicator 1A and the position detection system 2A is high and besides the general versatility is high. Further, a predetermined waveform correlativity is assured between the input signal and the output signal, and position detection by the sensor 20A becomes possible with a high sensitivity.

In particular, if the position indicator 1A is positioned closely to or contacted with the sensor 20A of the position detection system 2A, then the alternating signal supplied to the transmission conductor 23Y is inputted as a current signal to the feedback signal generation circuit 415 through the connection terminal 513 via the capacitance C1 and further via the peripheral electrode 6 as depicted in FIG. 1.

The alternating signal (current signal) inputted to the feedback signal generation circuit 415 is phase-inverted by the sense amplifier 510 and then amplified by the signal amplification factor variation circuit 520, whereafter it is boosted (multiplied) and signal-enhanced by the transformer 530 and is supplied as a voltage signal to the center electrode 7 via the connection terminal 523. In particular, the alternating signal inputted from the sensor 20A to the feedback signal generation circuit 415 via the peripheral electrode 6 is inverted in phase and converted into a signal of a greater amplitude by the feedback signal generation circuit 415 and then fed back to the sensor 20A via the center electrode 7.

In this case, since the alternating signal fed back from the center electrode 7 of the position indicator 1A to the sensor 20A of the position detection system 2A is an enhanced signal in the reverse phase of the alternating signal supplied to the transmission conductor 23Y, the position indicator 1A functions to increase the variation of the alternating signal of the reception signal of the reception conductor 24X. Therefore, the position detection system 2A can detect the contact position of the position indicator 1A with a high sensitivity. It is to be noted that, if the grounding conductor of the position indicator 1A is connected to the human body, then the detection action is stabilized further. In particular, in the present embodiment, the housing 3 of the position indicator 1A is covered with the conductor portion 32 connected to the grounding conductor of the printed circuit board 40. Therefore, the alternating signal supplied to the transmission conductor 23Y in the position detection system 2A flows to the ground via the position indicator 1A and further via the human body of the user thereby to achieve further stabilization of the signal detection action.

Further, where the voltage at the transmission conductor 23Y of the sensor 20A of the position detection system 2A is represented by V, the voltage of the center electrode 7 of the position indicator 1A of the present embodiment by e and the capacitance between the peripheral electrode 6 and the center electrode 7 by C2 (refer to FIG. 1), then they have the following relationship:

$$e \leq C1/C2 \cdot V$$

Therefore, in order to make the potential e at the center electrode 7 higher, it is advantageous to minimize the capacitance C2 between the peripheral electrode 6 and the center electrode 7.

To this end, in the position indicator 1 of the present embodiment, the shield member 8 is interposed between the peripheral electrode 6 and the center electrode 7 to minimize the coupling between them. Accordingly, in the position indicator 1 of the present embodiment, the shield member 8 is interposed to reduce the capacitance C2 between the peripheral electrode 6 and the center electrode 7, by which the potential e can be increased and the sensitivity can be raised efficiently.

The position indicator 1A of the embodiment described above is configured such that an alternating signal from the position detection system 2A is received by the peripheral electrode 6 and an output alternating signal after signal enhancement is fed back from the center electrode 7 to the position detection system 2A. However, the center electrode 7 may be used as the electrode for receiving an alternating signal from the position detection system 2A while the peripheral electrode 6 is used as the electrode for feeding back the alternating signal after signal enhancement to the position detection system 2A.

It is to be noted that, as depicted in FIG. 9, the position indicator 1A wirelessly transmits pen pressure information, side switch information and identification information from the wireless communication circuit 42 to the wireless communication circuit 25 of the position detection system 2A. The pen pressure information, side switch information and identification information received by the wireless communication circuit 25 are supplied to the control circuit 220A, by which they are transmitted, for example, to a host computer together with detected position information. Also additional information from the position indicator of the configuration type 1 is transmitted from the wireless communication circuit 42 to the position detection system in a similar manner.

<Position Indicator 1B of Configuration Type 3 and Corresponding Position Detection System 2B>

Figure 10:
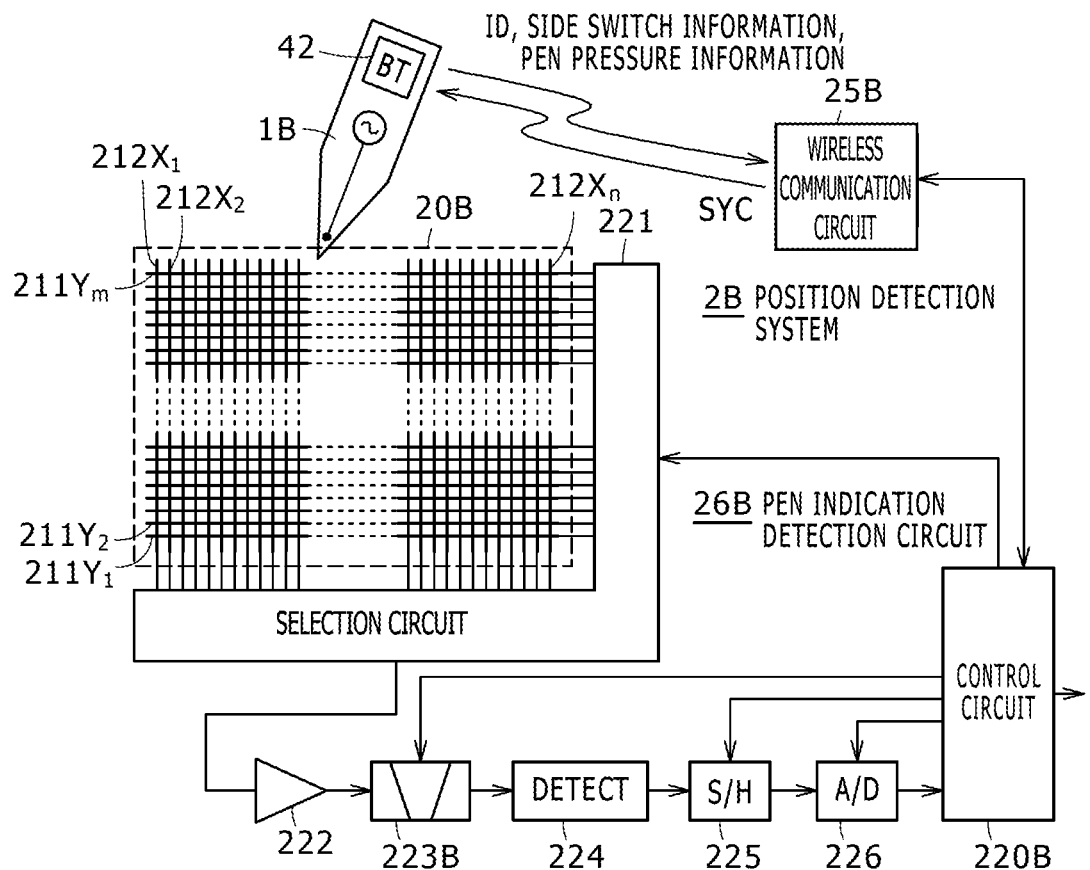
FIG. 10 is a view illustrating another example of a position indicator having a configuration type that can be configured according to one or more embodiments of the present disclosure and a corresponding position detection system.

FIG. 10 is a view depicting an example of a circuit of principal part of a position indicator 1B of the configuration type 3 and a corresponding position detection system 2B. The position indicator 1B of the configuration type 3 transmits an alternating signal of the frequency f1 as a stylus position signal and transmits all of pen pressure information, side switch information and identification information, which are additional information, from the wireless communication circuit 42 to a wireless communication circuit 25B of the position detection system 2B.

The position detection system 2B is configured from a sensor 20B, a pen indication detection circuit 26B connected to the sensor 20B, and a wireless communication circuit 25B. From the wireless communication circuit 25B of the position detection system 2B, an external synchronizing signal SYC is transmitted to the position indicator 1B as described hereinabove after pairing with the position indicator 1B is completed.

The sensor 20B is configured from a first conductor group 211, an insulating layer (not depicted) and a second conductor group 212 stacked in order from the lower layer side. The first conductor group 211 includes a plurality of first conductors $211Y_1$, $211Y_2$, ..., and $211Y_m$ (m is an integer equal to or greater than 1) extending in a horizontal direction (X axis direction) and disposed in parallel in a predetermined spaced relationship from each other in a Y axis direction.

Meanwhile, the second conductor group 212 includes a plurality of second conductors $212X_1$, $212X_2$, ..., and $212X_n$ (n is an integer equal to or greater than 1) extending in a direction intersecting with the extension direction of the first conductors $211Y_1$, $211Y_2$, ..., and $211Y_m$, in the present example, in a vertical direction (Y axis direction) orthogonal to the extension direction of the first conductors $211Y_1$, $211Y_2$, ..., and $211Y_m$ and disposed in parallel in a predetermined spaced relationship from each other in the X axis direction.

It is to be noted that, in the following description, where there is no necessity to distinguish the first conductors $211Y_1$, $211Y_2$, ..., and $211Y_m$ from each other, each of the conductors is referred to as first conductor 211Y. Similarly, where there is no necessity to distinguish the second conductors $212X_1$, $212X_2$, ..., and $212X_n$ from each other, each of the conductors is referred to as second conductor 212X.

The pen indication detection circuit 26B is configured from a selection circuit 221 which is an input/output interface with the sensor 20B, an amplification circuit 222, a band-pass filter 223B, a detection circuit 224, a sample hold circuit 225, an AD (Analog to Digital) conversion circuit 226 and a control circuit 220B.

The selection circuit 221 selects one conductor from within each of the first conductors 211Y and the second conductors 212X in accordance with a control signal from the control circuit 220B. The conductors selected by the selection circuit 221 are connected to the amplification circuit 222, and a signal from the position indicator 1B is detected by the selected conductors and amplified by the amplification circuit 222. An output of the amplification circuit 222 is supplied to the band-pass filter 223B, by which only a component of the frequency f1 of the signal transmitted thereto from the position indicator 1B is extracted.

An output signal of the band-pass filter 223B is detected by the detection circuit 224. An output signal of the detection circuit 224 is supplied to the sample hold circuit 225 and is sample-held at a predetermined timing with a sampling signal from the control circuit 220B, whereafter it is converted into a digital value by the AD conversion circuit 226. Digital data from the AD conversion circuit 226 is read and processed by the control circuit 220B.

The control circuit 220B acts to transmit control signals to the sample hold circuit 225, AD conversion circuit 226 and selection circuit 221 in accordance with a program stored in an internal ROM thereof. Further, the control circuit 220B calculates position coordinates on the sensor 20B indicated by the position indicator 1B from digital data from the AD conversion circuit 226.

Figure 11:
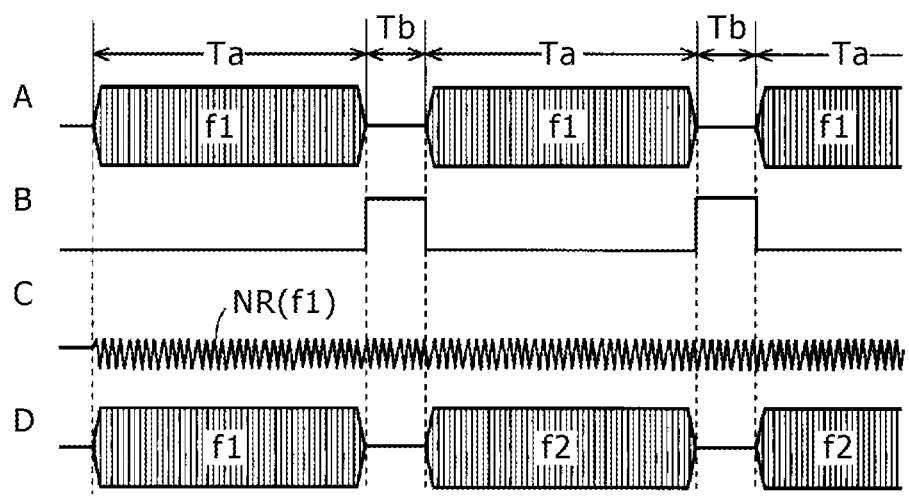
FIG. 11 is a timing chart illustrating the example of FIG. 10.

FIG. 11 is a timing chart illustrating a signal transmitted from the position indicator 1B of the configuration type 3 to the corresponding position detection system 2B. As described hereinabove, from the position indicator 1B of the configuration type 3, a signal, for example, based on an alternating signal of the frequency f1 is continuously transmitted as a stylus position signal via the center electrode 7.

However, the position indicator 1B of the configuration type 3 of the present example utilizes the fact that the position indicator 1 of the present embodiment has a configuration capable of transmitting an alternating signal of the frequency f1 and another alternating signal of the frequency f2 as a stylus position signal so that, if noise of a frequency equal to that of the stylus position signal exists, then the frequency of the stylus position signal can be switched.

In particular, in the position indicator 1B of the configuration type 3 of the present embodiment, the stylus position signal repeats one cycle including a continuous transmission period of a predetermined period length Ta and a pause period of another predetermined period length Tb as depicted in row A of FIG. 11.

Further, the control circuit 220B of the position detection system 2B detects whether or not noise of a frequency equal to that of the stylus position signal exists within a window interval provided by the pause interval of the predetermined period length Tb for detecting presence or absence of noise as depicted in row B of FIG. 11. If it is detected that noise of a frequency equal to that of the stylus position signal exists within the window interval, then the control circuit 220B of the position detection system 2B notifies the position indicator 1B of this via the wireless communication circuit 25B.

If the reception circuit 422 of the wireless communication circuit 42 of the position indicator 1B receives the notification from the position detection system 2B, then it transfers the notification to the control circuit 410 of the signal transmission controlling circuit 41. The control circuit 410 of the signal transmission control circuit 41 performs switching control of the switch circuit 414 in accordance with the notification to perform switching from the state in which the oscillator 45 of the frequency f1 is selected to the state in which the oscillator 46 of the frequency f2 is selected. It is to be noted that, where the stylus position signal from the position indicator 1B when the notification is received from the position detection system 2B is based on the signal from the oscillator 46 of the frequency f2, the control circuit 410 performs, on the basis of a notification from the position detection system 2B, switching control of the switch circuit 414 to perform switching from the state in which the oscillator 46 of the frequency f2 is selected to the state in which the oscillator 45 of the frequency f1 is selected.

For example, when the stylus position signal from the position indicator 1B is a signal of the frequency f1 as depicted in row A of FIG. 11, if noise NR of the same frequency f1 exists as depicted in row C of FIG. 11, then the control circuit 220B of the position detection system 2B detects the noise NR within a window interval depicted in row B of FIG. 11 and sends this fact to the position indicator 1B via the wireless communication circuit 25B.

In the position indicator 1B, the control circuit 410 receives this notification from the position detection system 2B via the reception circuit 422 of the wireless communication circuit 42 and performs switching control of the switch circuit 414 so that the frequency of the stylus position signal is switched from the frequency f1 to the frequency f2 as depicted in row D of FIG. 11. Accordingly, even if noise of a frequency equal to that of the stylus position signal exists around the position detection system 2B, it is possible to prevent the influence of the noise by switching of the frequency of the stylus position signal.

It is to be noted that, in the position detection system 2B, in order to allow compatibility with both of stylus position signals of the frequency f1 and the frequency f2, the band-pass filter 223B has a state in which it uses a pass frequency band having a center frequency same as the frequency f1 and another state in which it uses another pass frequency band having a different center frequency same as the frequency f2, and is configured for switching of the pass frequency band between the two pass frequency bands.

<Position Indicator 1C of Configuration Type 4 and Corresponding Position Detection System 2C>

Figure 12:
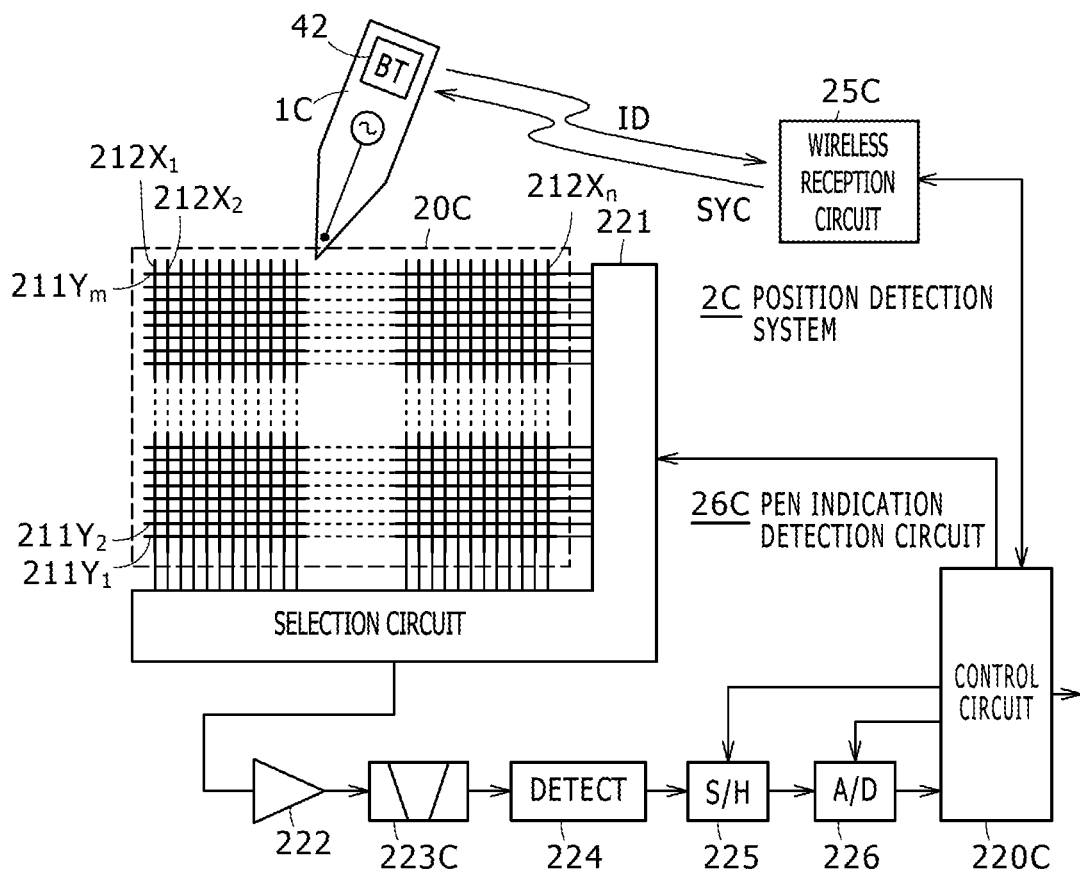
FIG. 12 is a view illustrating a further example of a position indicator having a configuration type that can be configured according to one or more embodiments of the present disclosure and a corresponding position detection system.

FIG. 12 is a view depicting an example of a circuit of part of a position indicator 1C of the configuration type 4 and a corresponding position detection system 2C. The position indicator 1C of the configuration type 4 transmits an alternating signal of the frequency f2 as a stylus position signal and transmits pen pressure information and side switch information which are examples of additional information important to a position indicator to the position detection system 2C via the center electrode 7 together with the stylus position signal. Further, the position indicator 1C transmits identification information of additional information from the wireless communication circuit 42 to a wireless communication circuit 25C of the position detection system 2C.

The position detection system 2C is configured from a sensor 20C, a pen indication detection circuit 26C connected to the sensor 20C and a wireless communication circuit 25C as depicted in FIG. 12. From the wireless communication circuit 25C of the position detection system 2C, an external synchronizing signal SYC is transmitted to the position indicator 1C as described hereinabove after pairing with the position indicator 1C is completed.

The sensor 20C has, in the present example, a configuration that is the same as that of the sensor 20B of the position detection system 2B. Further, the pen indication detection circuit 26C has a configuration that is the same as that of the pen indication detection circuit 26B except a band-pass filter 223C and a control circuit 220C.

The band-pass filter 223C of the position detection system 2C corresponding to the position indicator 1C of the configuration type 4 has, in the present example, a pass frequency band whose center frequency is the frequency f2. Further, the control circuit 220C includes a function for detecting pen pressure information and side switch information sent thereto together with a stylus position signal.

Figure 13:
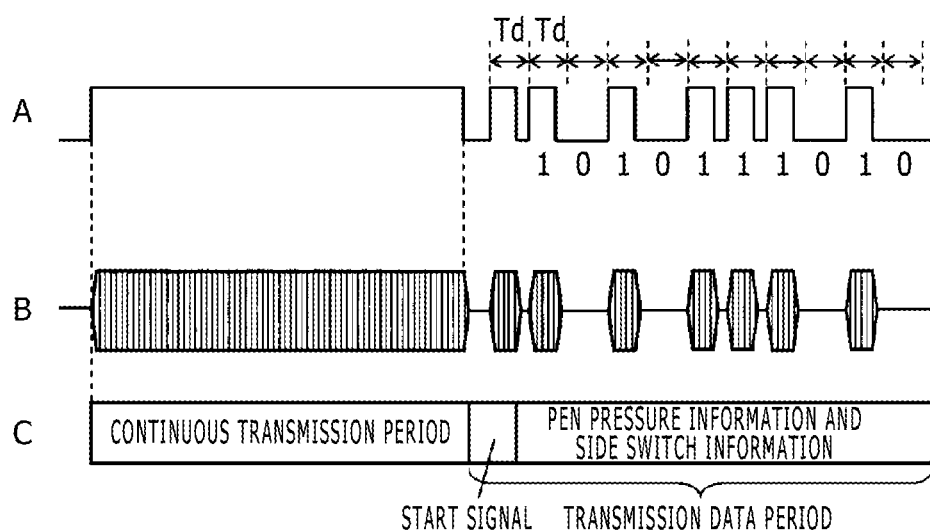
FIG. 13 is a timing chart illustrating the example of FIG. 12.

In the position indicator 1C of the configuration type 4 of the present example, the center electrode transmission signal generation circuit 412 repetitively outputs a signal of a pattern whose one cycle includes a continuous transmission period and a transmission data period under the control of the control circuit 410. Row A of FIG. 13 depicts an example of a control signal supplied from the control circuit 410 of the position indicator 1C to the center electrode transmission signal generation circuit 412. The center electrode transmission signal generation circuit 412 continuously transmits, within the fixed period within which the high level of the control signal of row A of FIG. 13 is maintained, an oscillation signal of the frequency f2 as a burst signal as depicted in row B of FIG. 13 (continuous transmission period of row C of FIG. 13).

The length of the continuous transmission period is a time length within which the pen indication detection circuit 26C of the position detection system 2C can detect an indicated position on the sensor circuit 20C by the position indicator 1C and is a time length within which, for example, all of the first conductors 211Y and the second conductors 212X can be scanned once or more, preferably by a plural number of times.

Within the continuous transmission period, the control circuit 410 of the position indicator 1C calculates the pen pressure applied to the center electrode 7 on the basis of the capacitance of the variable capacitance of the pen pressure detection circuit 9 and determines information of the calculated voltage value as a value of a plurality of bits (binary code). Further, the control circuit 410 generates on/off information of the side switch 43 as side switch information and as information of one bit or a plurality of bits.

Then, the control circuit 410 controls, within a transmission data period after an end of a continuous transmission period, the control signal to the high level or the low level in a predetermined cycle (Td) as depicted in row A of FIG. 13 to modulate an alternating signal of the frequency f2 by ASK (Amplitude Shift Keying). The control circuit 410 may generate an OOK (On Off Keying) signal in place of the ASK modulation.

At this time, within a first predetermined period (Td) after the continuous transmission period, the control circuit 410 controls the control signal to the high level without fail and uses the signal as a start signal of row C of FIG. 13. This start signal is a timing signal for making it possible for the pen indication detection circuit 26C of the position detection system 2C to decide later data transmitting timings accurately. It is to be noted that, in place of this start signal, a burst signal within a continuous transmission period can be utilized as a timing signal.

The center electrode transmission signal generation circuit 412 of the position indicator 1C successively transmits pen pressure information of a plurality of bits or side switch information of a plurality of bits following the start signal within a transmission data period under the control of the control circuit 410 described above. In this case, as depicted in rows A and B of FIG. 13, when the transmission data (binary code) is "0," the control signal (row A of FIG. 13) is controlled to the low level so that no alternating signal is outputted, but when the transmission data (binary code) is "1," the control signal is controlled to the high level so that an alternating signal is outputted thereby to perform ASK modulation.

In the pen indication detection circuit 26C of the position detection system 2C, the control circuit 220C detects an indicated position by the position indicator 1C from a reception signal within a continuous transmission period similarly as in the case of the position detection system 2B described hereinabove. Then, the control circuit 220C waits until the continuous transmission period comes to an end and then, if a start signal after the end of the continuous transmission period is detected, performs actions to detect data of the pen pressure information and the side switch information within the transmission data period and restore the data. Then, the control circuit 220C outputs, together with identification information received via the wireless communication circuit 25C, the detection information of the indicated position by the position indicator 1C, pen pressure information and side switch information to a host computer or the like.

It is to be noted that also the position indicator 1C of the configuration type 4 may be configured such that it can perform switching of the frequency of the stylus position signal similarly to the position indicator 1B of the configuration type 3 so that the influence of noise can be reduced. In this case, also the band-pass filter 223C and the control circuit 220C of the position detection system 2C are configured such that they have functions similar to those of the band-pass filter 223B and the control circuit 220B of the position detection system 2B corresponding to the configuration type 3.

<Position Indicator 1D of Configuration Type 5 and Corresponding Position Detection System 2D>

Figure 14:
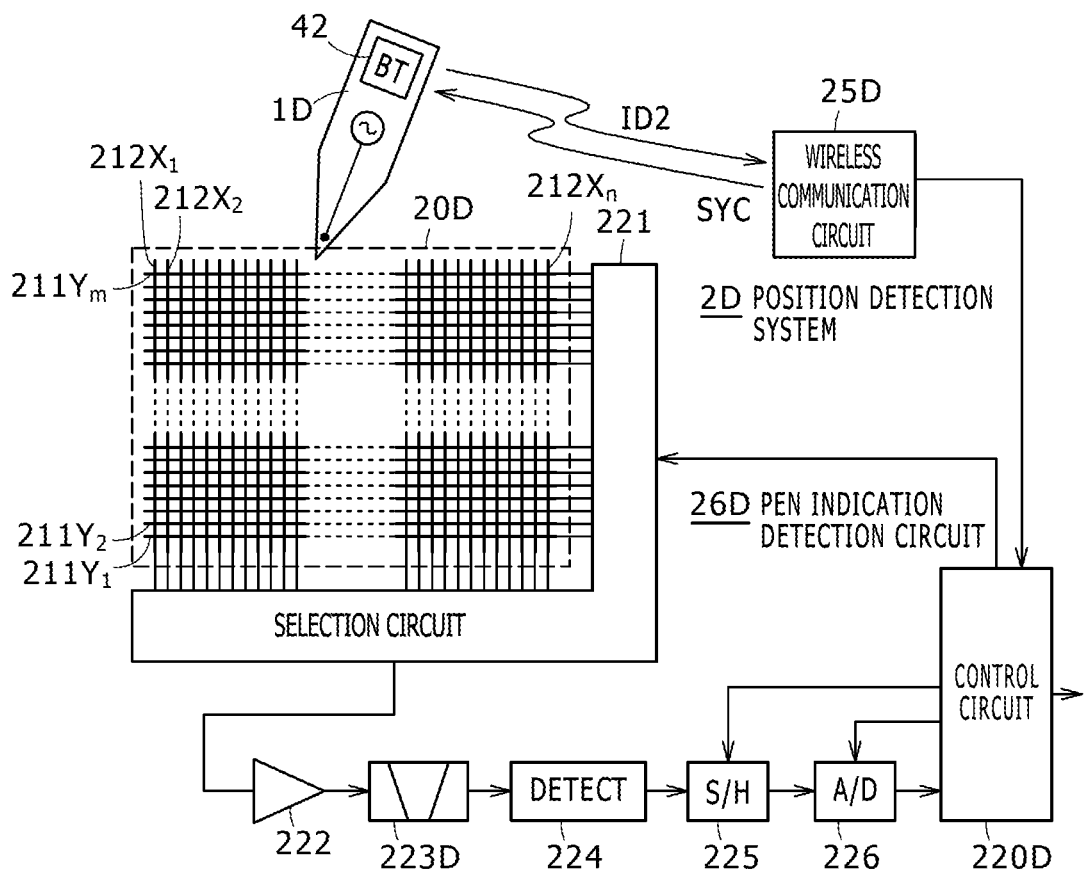
FIG. 14 is a view illustrating a still further example of the position indicator of the configuration type which can be configured by the embodiment of the position indicator according to one or more embodiments of the present disclosure and a corresponding position detection system.

FIG. 14 is a view depicting an example of a circuit of part of a position indicator 1D of the configuration type 5 and a corresponding position detection system 2D. The position indicator 1D of the configuration type 5 transmits an alternating signal of the frequency f2 as a stylus position signal and transmits all additional information, in the present example, all of pen pressure information, side switch information and identification information ID1, to the position detection system 2D via the center electrode 7 together with the stylus position signal.

The position detection system 2D includes, as depicted in FIG. 14, a sensor 20D, a pen indication detection circuit 26D connected to the sensor 20D, and a wireless communication circuit 25D. From the wireless communication circuit 25D of the position detection system 2D, an external synchronizing signal SYC is transmitted to the position indicator 1D as described hereinabove after pairing with the position indicator 1D is completed.

The sensor 20D has, in the present example, a configuration same as that of the sensor 20B of the position detection system 2B. Further, the pen indication detection circuit 26D has a configuration same as that of the pen indication detection circuit 26C including a band-pass filter 223D except a control circuit 220D. In particular, the band-pass filter 223D has, in the present example, a pass frequency band whose center frequency is the frequency f2. Further, the control circuit 220D includes a function for detecting pen pressure information, side switch information and identification information ID1 sent thereto together with a stylus position signal.

Figure 15:
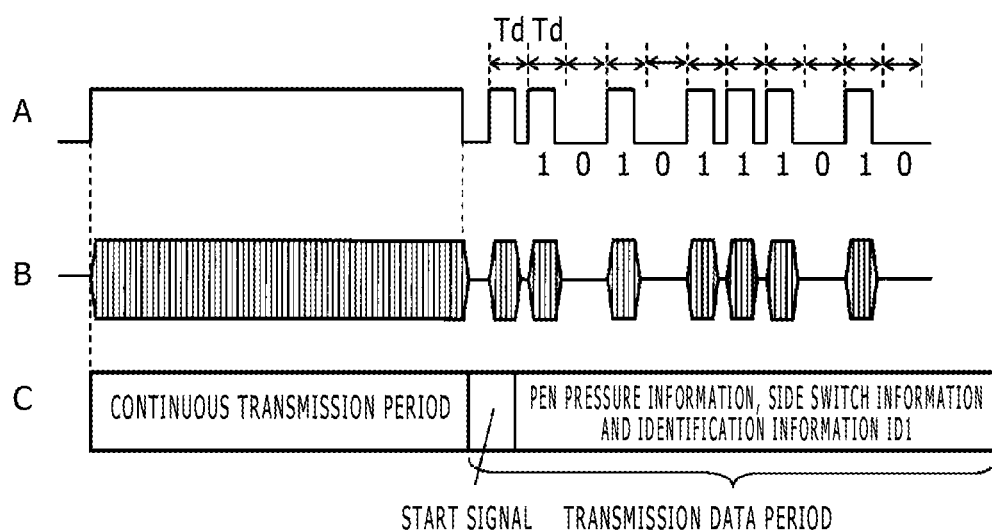
FIG. 15 is a timing chart illustrating the example of FIG. 14.

Also in the position indicator 1D of the configuration type 5 of the present example, the center electrode transmission signal generation circuit 412 repetitively outputs a signal of a pattern whose one cycle includes a continuous transmission period and a transmission data period as depicted in FIG. 15 under the control of the control circuit 410 similarly as in the position indicator 1C of the configuration type 4 described hereinabove.

Row A of FIG. 15 depicts an example of a control signal supplied from the control circuit 410 of the position indicator 1D to the center electrode transmission signal generation circuit 412. The center electrode transmission signal generation circuit 412 of the position indicator 1D of the present example continuously transmits, within the continuous transmission period, an oscillation signal of the frequency f2 as a burst signal as depicted in row B of FIG. 15 under the control of the control signal of row A of FIG. 15. On the other hand, within the transmission data period, the center electrode transmission signal generation circuit 412 transmits pen pressure information, side switch information and identification information ID1 as an ASK signal to the position detection system 2D via the center electrode 7 as depicted in rows B and C FIG. 15.

The control circuit 220D of the position detection system 2D detects, on the basis of the burst signal within the continuous transmission period, the position on the sensor 20D indicated by the position indicator 1D and detects and restores, within the transmission data period, the pen pressure information, side switch information and identification information ID1.

Further, in this example, the position indicator 1D transmits identification information ID2 from the wireless communication circuit 42 to the wireless communication circuit 25D of the position detection system 2D to make receiving and transmitting signals between the position indicator 1D and the position detection system 2D more secure. In this case, the identification information ID1 and the identification information ID2 are made same information (ID1=ID2). The control circuit 220D compares the identification information ID2 acquired via the wireless communication circuit 25D and the identification information ID received and detected via the center electrode 7 with each other, and determines, only when they coincide with each other, the signal acquired from the position indicator 1D as valid and processes the signal.

Then, when the control circuit 220D determines that the signal acquired from the position indicator 1D is valid, the control circuit 220D outputs the detection information of the indicated position by the position indicator 1D and the pen pressure information, side switch information and identification information ID1 to the host computer or the like.

Other Embodiments

<Other Example of Capacitive Coupling>

The plurality of configuration types of a position indicator described hereinabove are examples, and it is a matter of course that the configuration type of a position indicator is not limited the configuration types connected here. For example, while, in the position indicator of the active type described hereinabove, a signal is transmitted only from the center electrode 7, the configuration type of a position indicator configured such that, in order to make it possible to detect an inclination angle or a rotational angle of a position indicator on a position detection system, the peripheral electrode 6 is divided into a plurality of peripheral electrodes and, from each of the plurality of divisional peripheral electrodes, a signal for making it possible to identify the divisional peripheral electrode is transmitted is made one configuration type.

<Example of Electromagnetic Coupling>

Further, while the embodiment described above is a position indicator and a position detection system of the capacitive coupling type, the present disclosure can be applied also to a position indicator and a position detection system of the electromagnetic coupling type.

Figure 16:
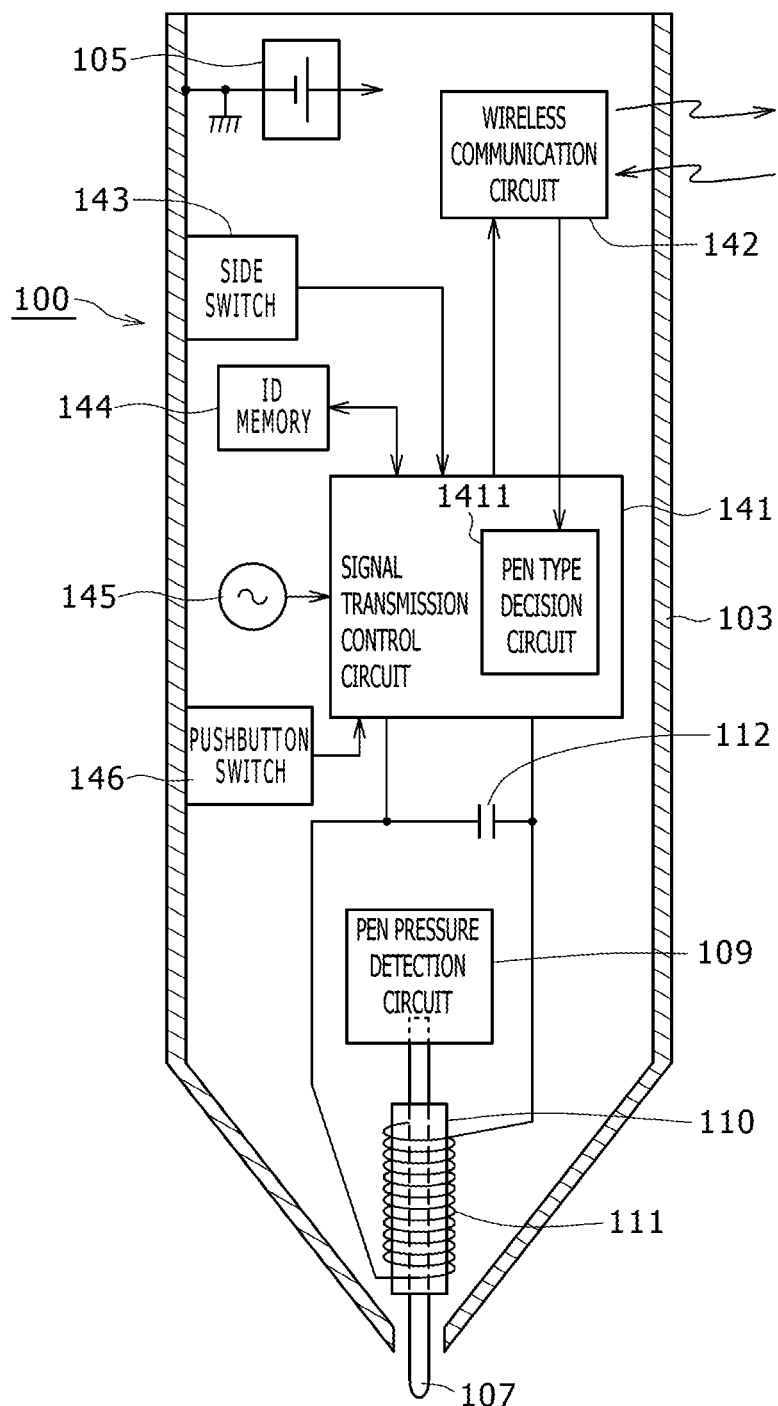
FIG. 16 is a view depicting a conceptual configuration of a position indicator according to one or more embodiments of the present disclosure.

FIG. 16 depicts an example of a configuration of a position indicator 100 of the electromagnetic coupling type according to the present disclosure and corresponds to the conceptual block diagram of FIG. 1 which depicts the position indicator 1 of the embodiment described hereinabove.

As depicted in FIG. 16, the position indicator 100 of the present embodiment includes, in a cylindrical housing 103 made of an insulator, for example, a resin, a signal transmission controlling circuit 141, a wireless communication circuit 142, a side switch 143, an ID memory 144 and an oscillator 145 and further includes a pen pressure detection circuit 109. Further, a battery 105 is provided as a supply source of a power supply voltage to the signal transmission controlling circuit 141, wireless communication circuit 142, side switch 143, ID memory 144, oscillator 145 and so forth in the housing 103. The signal transmission controlling circuit 141 includes a pen type decision circuit 1411.

To the pen pressure detection circuit 109, a core member 107 extending through a ferrite core 110 is coupled, and the pen pressure detection circuit 109 detects a pen pressure applied to the core member 107 as a capacitance of a variable capacitor configured from the pen pressure detection circuit 109. A coil 111 is wound on the ferrite core 110 and is connected at the opposite terminals thereof to the signal transmission control circuit 141. Further, between the opposite terminals of the coil 111, a capacitor 112 cooperating with the coil 111 to configure a resonance circuit is connected.

To the signal transmission controlling circuit 141, the wireless communication circuit 142, side switch 143, ID memory 144 and oscillator 145 are connected similarly as in the position indicator 1 of the embodiment described hereinabove, and also the variable capacitor configured from the pen pressure detection circuit 109 is connected to the signal transmission controlling circuit 141.

In the position indicator 100, the signal transmission control circuit 141 controls selection of a signal to be transmitted via a resonance circuit including the coil 111 and the capacitor 112 and controls selection regarding whether additional information such as pen pressure information, side switch information and identification information is to be transmitted from the wireless communication circuit 142 or to be transmitted as a signal from the resonance circuit.

In particular, in the case of the position indicator 100 of the present embodiment, the resonance circuit configures a second transmission circuit and the transmission circuit of the wireless communication circuit 142 configures a first transmission circuit. Further, the reception circuit of the wireless communication circuit 142 configures a reception circuit for receiving pen type information from the position detection system. The pen type information received from the position detection system by the reception circuit of the wireless communication circuit 142 is supplied to the pen type decision circuit 1411 of the signal transmission control circuit 141. Also in the present embodiment, the pen type decision circuit 1411 can be configured, though not depicted, from a pen type discrimination processing circuit and a pen type table memory.

Figure 17A:
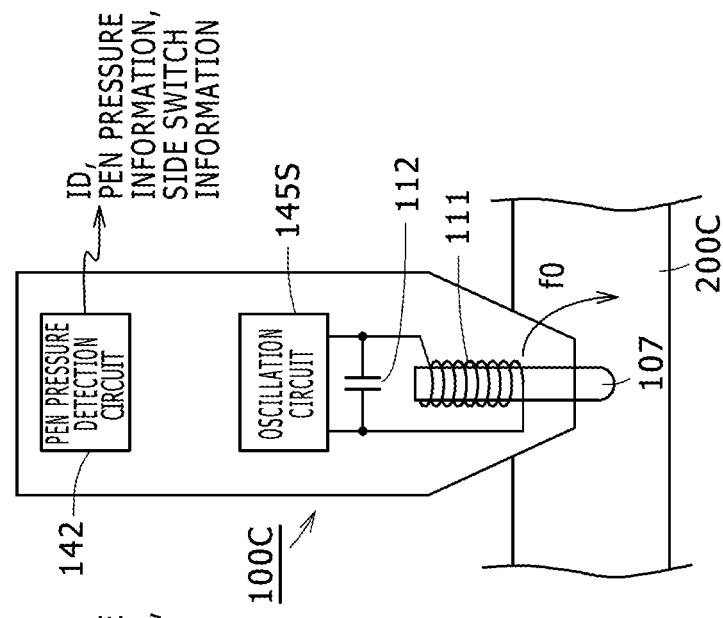
FIGS. 17A, 17B, and 17C each illustrate an example of a position indicator having a configuration type which can be configured according to one or more embodiments of the present disclosure.
Figure 17B:
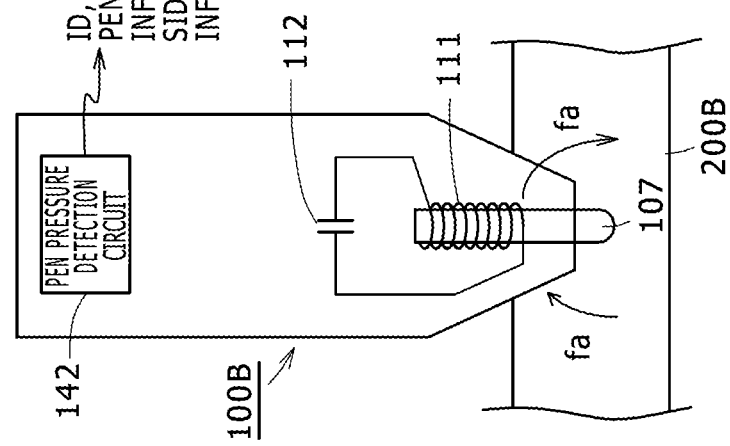
Figure 17C:
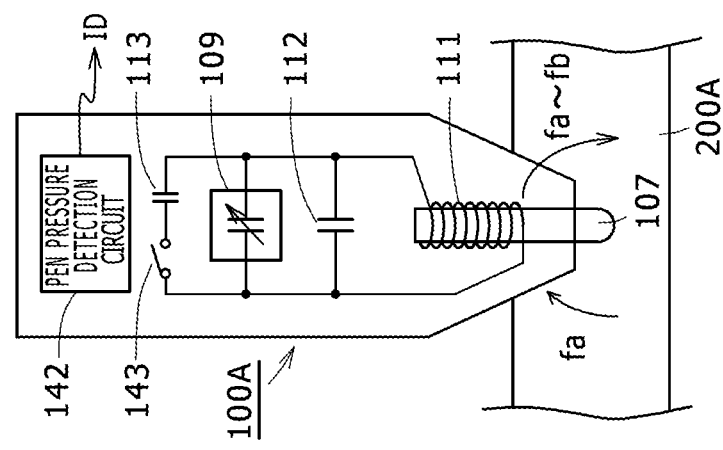

The signal transmission controlling circuit 141 of the position indicator 100 of the present embodiment receives pen type information from the position detection system and can decide the pen type by determining the pen type with the pen type decision circuit 1411 to configure, for example, such position indicators 100A, 100B and 100C of three different configuration types 6, 7 and 8 as depicted in FIGS. 17A, 17B, and 17C, respectively.

If pen type information received from the position detection system via the reception circuit of the wireless communication circuit 142 of the position indicator 100 is the configuration type 6, then such a position indicator 100A as depicted in FIG. 17A is configured by the signal transmission controlling circuit 141. In particular, in this configuration type 6, the variable capacitor configured from the pen pressure detection circuit 109 is connected in parallel to a parallel resonance circuit configured from the coil 111 and the capacitor 112, and further, a serial circuit of the side switch 143 and a capacitor 113 is connected.

Further, a sensor of a position detection system 200A which is used together with the position indicator 100A of the configuration type 6 and sends the configuration type 6 as pen type information to the position indicator 100A is configured such that, though not depicted, a plurality of loop coils are arrayed in an X direction and a Y direction which are orthogonal to each other such that a transmission signal (alternating signal) of frequency fa is transmitted from the loop coils to the position indicator 100A.

In the position indicator 100A, an alternating signal from the position detection system 200A is received by the resonance circuit through electromagnetic coupling, and then the alternating signal is fed back from the resonance circuit to the position detection system 200A. In the position detection system 200A, the position indicated by the position indicator 100A is detected from the position of a loop coil from which the alternating signal is transmitted and the position of another loop coil which receives the feedback signal from the position indicator 100A.

In this case, since the feedback signal from the position indicator 100A varies as the resonance frequency of the resonance circuit varies depending upon the value of the capacitance of the variable capacitor configured from the pen pressure detection circuit 109, the position detection system 200A detects pen pressure information from the variation of the frequency (or from the variation of the phase).

Further, since the capacitor 113 is placed into a connection state or a disconnection state to or from the resonance circuit in response to switching on and off of the side switch 143, the resonance frequency of the resonance circuit varies in response to switching on and off of the side switch 143. The position detection system 200A detects side switch information corresponding to switching on and off of the side switch 143 from the variation of the frequency (or from the variation of the phase) of the feedback signal from the position indicator 100A.

It is to be noted that the position indicator 100A of the configuration type 6 transmits identification information to the wireless communication circuit of the position detection system 200A via the transmission function circuit of the wireless communication circuit 142.

If the pen type information received from the position detection system via the reception circuit of the wireless communication circuit 142 of the position indicator 100 is the configuration type 7, then the signal transmission controlling circuit 141 configures such a position indicator 100B as depicted in FIG. 17B. In particular, in the configuration type 7, the parallel resonance circuit is configured from a coil 111 and a capacitor 112. All of pen pressure information, side switch information and identification information are transmitted to the wireless communication circuit of a position detection system 200B via the transmission circuit of the wireless communication circuit 142.

The sensor circuit of the position detection system 200B which is used together with the position indicator 100B of the configuration type 7 and sends the configuration type 7 as pen type information to the position indicator 100B has a configuration same as that of the sensor of the position detection system 200A. Thus, a transmission signal (alternating signal) of the frequency fa is transmitted from a loop coil to the position indicator 100B.

In the position indicator 100B, an alternating signal from the position detection system 200B is received by the resonance circuit through electromagnetic coupling and is thereafter fed back from the resonance circuit to the position detection system 200B similarly as in the case of the position indicator 100A. The position detection system 200B detects a position indicated by the position indicator 100B in a similar manner as in the position detection system 200A.

The position detection system 200B of the configuration type 7 does not include a function for monitoring a variation of the frequency or the phase of a feedback signal to detect additional information. The position detection system 200B decodes additional information received via the wireless communication circuit to acquire pen pressure information, side switch information and identification information.

If the pen type information received from the position detection system via the reception circuit of the wireless communication circuit 142 of the position indicator 100 is the configuration type 8, then the signal transmission controlling circuit 141 configures such a position indicator 100C as depicted in FIG. 17C. In particular, in the position indicator 100C of the configuration type 8, the parallel resonance circuit configured from the coil 111 and the capacitor 112 is coupled to the oscillator 145 to configure an oscillation circuit 145S. An oscillation signal from the oscillation circuit 145S is transmitted to a position detection system 200C via the parallel resonance circuit configured from the coil 111 and the capacitor 112.

Further, pen pressure information, side switch information and identification information are all transmitted to the wireless communication circuit of the position detection system 200C via the transmission circuit of the wireless communication circuit 142.

The sensor of the position detection system 200C which is used together with the position indicator 100C of the configuration type 8 and sends the configuration type 8 as pen type information is configured such that, though not depicted, a plurality of loop coils are arrayed in an X direction and a Y direction orthogonal to each other.

The position detection system 200C receives an alternating signal transmitted thereto from the position indicator 100C by a loop coil through electromagnetic coupling. Further, the position detection system 200C detects the position indicated by the position indicator 100C from the positions of the loop coil in the X direction and the Y direction by which the alternating signal is received.

It is to be noted that also the configuration types 6 to 8 described above are examples and various other types are available as the configuration type of the position indicator and the position detection system of the electromagnetic coupling type, and it is a matter of course that the position indicator of the present disclosure can be configured so as to match with those various configuration types. For example, while, in the configurations 6 to 8 described above, identification information is not transmitted via the resonance circuit, also it is possible to configure a configuration type wherein the resonance action of the resonance circuit or the switching on/off of the resonance action of the oscillation circuit 145S is controlled to transmit identification information as an ASK modulation signal or an OOK signal from the core member 107 side.

<Example of Hybrid Position Indicators of Both of Capacitive Coupling Type and Electromagnetic Coupling Type>

Figure 18A:
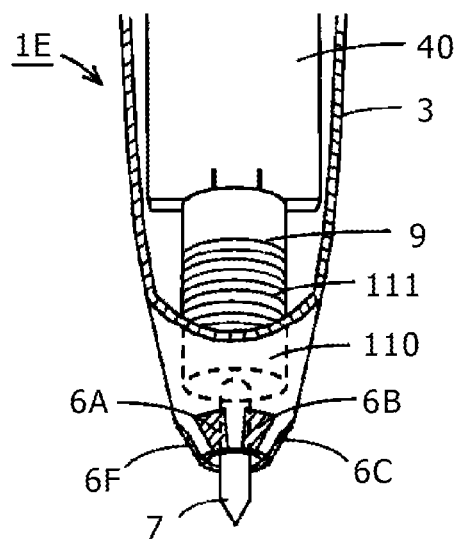
FIGS. 18A and 18B illustrate examples of a position indicator having a configuration type that can be configured according to one or more embodiments of the present disclosure.
Figure 18B:
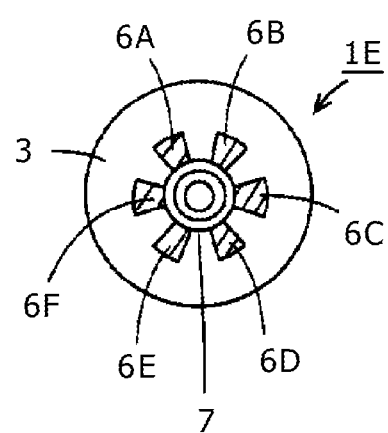
Figure 19:
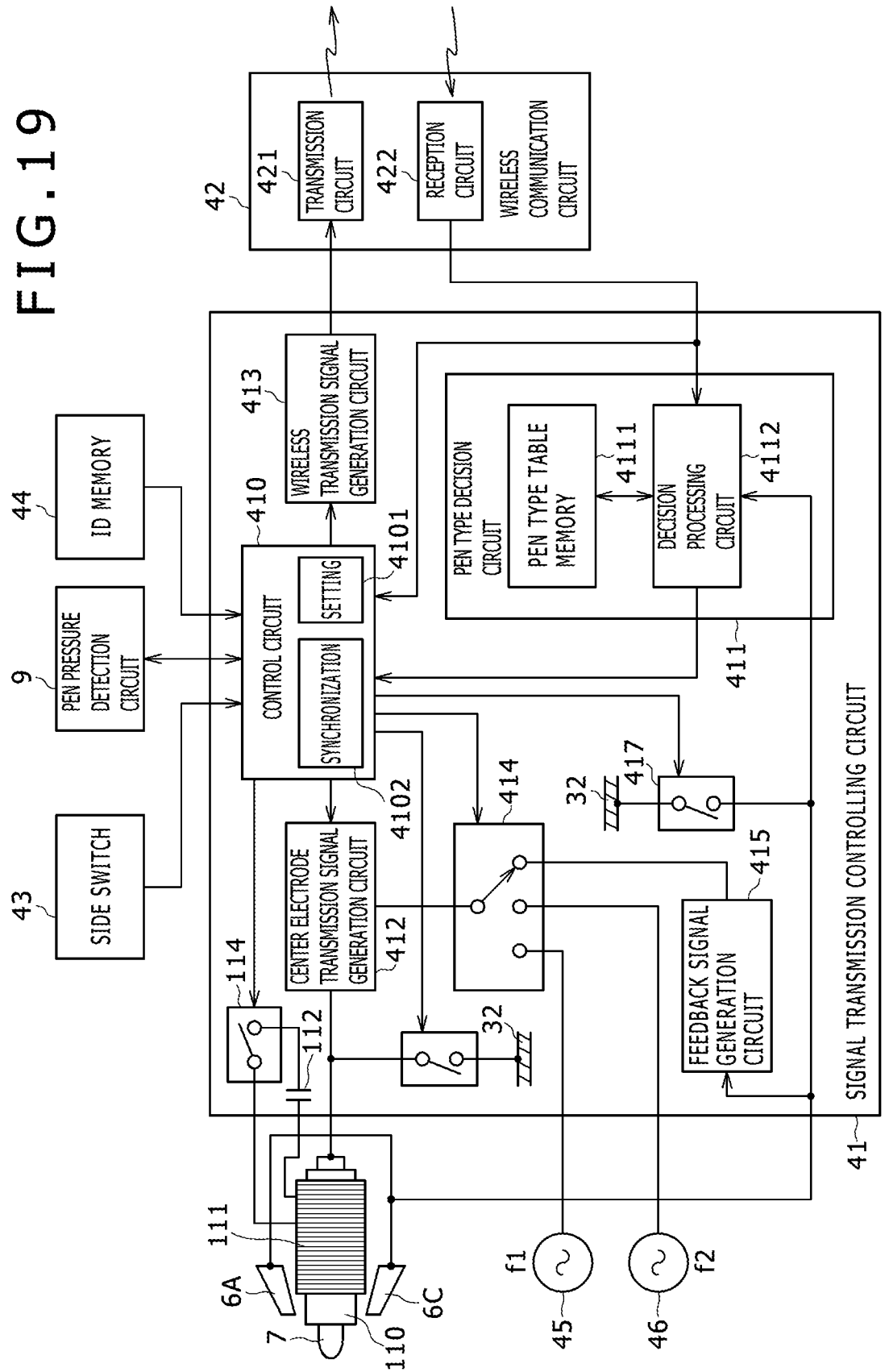
FIG. 19 is a view illustrating an example of a position indicator having a configuration type that can be configured according to one or more embodiments of the present disclosure.

FIGS. 18 and 18B are views depicting major part of a position indicator 1E of a configuration type which includes both of an active capacitive pen of the capacitive coupling type and an electronic pen of the electromagnetic coupling type, and FIG. 18A is a view illustrating a configuration portion of the center electrode 7 side having a conductivity and FIG. 18B is a view when the position indicator 1E is viewed in an axial direction thereof from the tip end side of the center electrode 7. Further, FIG. 19 is a block diagram depicting an example of a configuration of an electronic circuit of the position indicator 1E of the present example as depicted in FIGS. 18A and 18B.

In the present position indicator 1E, the peripheral electrode, which is made of a conductor provided around an opening in which the center electrode 7 is inserted, of the housing 3 is formed from six divisional portions as divisional peripheral electrodes 6A, 6B, 6C, 6D, 6E and 6F. The divisional peripheral electrodes 6A to 6F are provided in a mutually electrically isolated separated state as depicted in FIGS. 18A and 18B.

The center electrode 7 is fitted in a pen pressure detection circuit 9 through a through-hole provided in the ferrite core 110 and is configured such that it receives a signal from a signal transmission controlling circuit configured on a board 40. A coil 111 is wound on the ferrite core 110, and a capacitor 112 is connected in parallel to the coil 111 via a switch circuit 114 as depicted in FIG. 19.

In the case of the configuration type of an active capacitive pen of the capacitive coupling type, the switch circuit 114 is controlled off by a control signal from the control circuit 410, and the parallel resonance circuit configured from the coil 111 and the capacitor 112 is not configured. Further, in the case of the configuration type of the active capacitive pen of the capacitive coupling type, a signal from the signal transmission controlling circuit is transmitted via the center electrode 7, whereupon the divisional peripheral electrodes 6A to 6F are used as a shield electrode.

On the other hand, in the case of the configuration type of the electronic pen of the electromagnetic coupling type, the switch circuit 114 is switched on by a control signal from the control circuit 410 and the parallel resonance circuit configured from the coil 111 and the capacitor 112 is configured. By the parallel resonance circuit, a signal from the position detection system 2 is received and fed back by the electromagnetic coupling to transmit a stylus position signal to the position detection system 2 similarly as in the case of FIG. 16. At this time, since the divisional peripheral electrodes 6A to 6F are separated from each other, it is possible to prevent magnetic fluxes for electromagnetic coupling between the parallel resonance circuit and the position detection system 2 from being shielded.

Other Embodiments or Modifications

In the pen pressure detection circuits 9 and 109 of the embodiments described above, a variable capacitor is used wherein a dielectric is sandwiched by the first electrode and the second electrode and one of the first electrode and the second electrode is mounted for movement in an axial direction in response to a pen pressure such that the capacitance thereof is variable in response to the pen pressure. However, the configuration of the pen pressure detection circuit is not limited to this. For example, it is possible to configure the pen pressure detection circuit 9 using such a semiconductor element whose capacitance is variable in response to a pen pressure as disclosed in Japanese Patent Laid-Open No. 2013-161307. Alternatively, the pen pressure detection circuit may be configured using a structure or an element having not a capacitance but an inductance value or a resistance value which is variable in response to a pen pressure.

Further, the additional information is not limited to pen pressure information, side switch information, identification information or the like as described above, but various other information such as, for example, capacity information of a battery can be used as additional information.

Further, while the driving power supply for the position indicator in the foregoing description of the embodiments is a battery, a capacitor for accumulating a power supply voltage may be provided in the position indicator such that the capacitor is used as a driving power supply. In this case, the configuration for accumulating the power supply voltage into the capacitor may be a configuration of a charging circuit for receiving electric power energy from the outside through electromagnetic induction or electric field coupling and charging the capacitor, or further, a charging terminal may be provided for the position indicator such that charging current is supplied from a charging apparatus for exclusive use via the charging terminal. The electric power energy from the outside (electromagnetic energy or electric field energy) may be supplied from the position detection apparatus to the position indicator or may be supplied from an electric power supplying apparatus for exclusive use.

Further, while the position indicators in the embodiments described above include two transmission circuits of a center electrode and a wireless communication circuit, they may otherwise include three or more transmission circuits.

It is to be noted that, in the description of the position indicator of each of the embodiments described above, if the position indicator is operated to move to the proximity of or contact with the sensor of the position detection system, then the position indicator automatically comes to have a configuration type compatible with the position detection system. However, the position indicator may be configured so as to be set to a selected and desired configuration type by configuring the position indicator so as to communicate not with the position detection system but with an outer device such as a personal computer which can communicate with the wireless communication circuit of the position indicator and selecting the desired configuration type through the outer device such as a personal computer.

Alternatively, the position indicator may be configured such that a switch for switching setting of a configuration type may be provided on the position indicator such that the position indicator is set to a desired configuration type by a switching operation by the switch for switching setting. In particular, the example of FIG. 16 is configured such that a pushbutton switch 146 which can be operated by the user is provided on the housing 103 such that a depression operation signal of the pushbutton switch 146 is supplied to the signal transmission controlling circuit 141. In this case, the signal transmission controlling circuit 141 performs control for changing the configuration type, for example, every time the pushbutton switch 146 is depressed by the user. It is to be noted that, also in the example of FIG. 1, a pushbutton switch may be provided similarly.

DESCRIPTION OF REFERENCE SYMBOLS 1, 1A to 1E, 100A to 100C . . . Position indicator, 2, 2A to 2D, 200A to 200C . . . Position detection system, 3 . . . Housing, 31 . . . Insulator portion, 32 . . . Conductor portion, 5 . . . Battery, 6 . . . Peripheral electrode 7 . . . Center electrode, 8 . . . Shield member, 9 . . . Pen pressure detection circuit, 40 . . . Printed circuit board, 41 . . . Signal transmission control circuit, 42 . . . Wireless communication circuit, 43 . . . Side switch, 44 . . . ID memory, 45, 46 . . . Oscillator, 48 . . . Power supply switch, 410 . . . Control circuit, 411 . . . Pen type decision circuit

The invention claimed is:

1. A position indicator that communicates with a position detection system, comprising:
    a reception circuit which, in operation, receives a signal transmitted from the position detection system;
    a signal generation circuit which, in operation, generates a stylus position signal;

a pressure information generation circuit which, in operation, generates pressure information;

a pen pressure detection circuit to detect a pen pressure applied to the position indicator, wherein the pressure information generated by the pressure information generation circuit is based on the pen pressure detected by the pen pressure detection circuit;

a first transmission circuit;

a second transmission circuit that is different from the first transmission circuit; and a control circuit which, in operation, controls:

transmission of the stylus position signal from the second transmission circuit to the position detection system, selection of the first transmission circuit or the second transmission circuit, and transmission of the pressure information from the selected transmission circuit to the position detection system, and configuration of the position indicator in response to the signal transmitted from the position detection system, wherein the transmission of the pressure information to the position detection system is synchronized with the signal transmitted from the position detection system.

2. The position indicator according to claim 1, wherein:

the second transmission circuit includes a center electrode disposed at one end in an axial direction of an elongated cylindrical housing along a central axis of the cylindrical housing and a peripheral electrode surrounding a periphery of the center electrode, and the control circuit controls the transmission of the stylus position signal to the position detection system from the center electrode, from the peripheral electrode, or from both the center electrode and the peripheral electrode.

3. The position indicator according to claim 1, wherein the control circuit controls the transmission of the stylus position signal from the second transmission circuit to the position detection system through capacitive coupling, and controls the transmission of the pressure information from the first transmission circuit to the position detection system through wireless coupling.

4. The position indicator according to claim 1, wherein the control circuit controls the transmission of the stylus position signal from the second transmission circuit to the position detection system through inductive coupling, and controls the transmission of the pressure information from the first transmission circuit to the position detection system through wireless coupling.

5. The position indicator according to claim 1, wherein the pen pressure detection circuit, in operation, detects a pressure applied to a member disposed at one end in an axial direction of an elongated cylindrical housing of the position indicator.

6. The position indicator according to claim 1, further comprising:

a storage device which, in operation, stores identification information, wherein the control circuit, in operation, controls selection of the first transmission circuit or the second transmission circuit, and transmits the identification information from the selected transmission circuit to the position detection system.

7. The position indicator according to claim 1, further comprising:

a switch which, in operation, accepts an operation of a user, wherein the control circuit, in operation, controls selection of the first transmission circuit or the second transmission circuit, and transmits information regarding a state of the switch from the selected transmission circuit.

8. The position indicator according to claim 1, wherein the reception circuit wirelessly receives the signal from the position detection system.

9. The position indicator according to claim 1, wherein the reception circuit is disposed at one end in an axial direction of an elongated cylindrical housing and receives the signal through capacitive coupling with the position detection system.

10. The position indicator according to claim 1, further comprising:

a storage device that stores information included in the signal transmitted from the position detection system, wherein the control circuit, in operation, controls the selection of the first transmission circuit or the second transmission circuit based on the information stored in the storage device, and transmits the pressure information from the selected transmission circuit to the position detection system.

11. The position indicator according to claim 1, wherein the transmission of the stylus position signal to the position detection system is synchronized with the signal transmitted from the position detection system.

12. A method performed by a position indicator that includes a first transmission circuit and a second transmission circuit that communicate with a position detection system, the method comprising:

receiving a signal transmitted from the position detection system;

generating a stylus position signal;

generating pressure information including pen pressure information indicative of a pressure applied to the position indicator;

controlling transmission of the stylus position signal from the second transmission circuit to the position detection system;

controlling selection of the first transmission circuit or the second transmission circuit, and transmission of the pressure information from the selected transmission circuit to the position detection system; and configuring the position indicator in response to the signal transmitted from the position detection system, wherein the transmission of the pressure information to the position detection system is synchronized with the signal transmitted from the position detection system.

13. The method according to claim 12, wherein:

the second transmission circuit includes a center electrode disposed at one end in an axial direction of an elongated cylindrical housing along a central axis of the cylindrical housing and a peripheral electrode surrounding a periphery of the center electrode, and the method comprises:

controlling the transmission of the stylus position signal from the center electrode, from the peripheral electrode, or from both the center electrode and the peripheral electrode.

14. The method according to claim 12, comprising:

controlling the transmission of the stylus position signal from the second transmission circuit to the position detection system through capacitive coupling or through inductive coupling, and controlling the transmission of the pressure information from the first transmission circuit to the position detection system through wireless coupling.

15. The method according to claim 12, wherein the pen pressure information is generated based on a pressure applied to a member disposed at one end in an axial direction of an elongated cylindrical housing of the position indicator.

16. The method according to claim 12, wherein:
   the position indicator includes a switch operable by a user, wherein the method comprises:
   controlling selection of the first transmission circuit or the second transmission circuit, and transmission of information regarding a state of the switch from the selected transmission circuit.

17. The method according to claim 12, comprising:
   wirelessly receiving the signal transmitted from the position detection system.

18. The method according to claim 12, comprising:
   receiving the signal transmitted from the position detection system through capacitive coupling with the position detection system.

19. The method according to claim 12, comprising:
   storing information included in the signal transmitted from the position detection system; and
   controlling the selection of the first transmission circuit or the second transmission circuit, from which to transmit the pressure information to the position detection system, based on the stored information.

20. The method according to claim 12, wherein the transmission of the stylus position signal to the position detection system is synchronized with the signal transmitted from the position detection system.

\* \* \* \* \*